Dec. 13, 1966 R. C. TALBOT 3,290,859

TRAY LOADER

Filed Feb. 19, 1964 18 Sheets-Sheet 1

INVENTOR
RICHARD C. TALBOT

BY Hill, Sherman, Meroni, Gross & Simpson
ATTORNEYS

INVENTOR.
RICHARD C. TALBOT
BY
Hill, Sherman, Meroni, Gross & Simpson
ATTORNEYS

TRAY LOADER

Filed Feb. 19, 1964 18 Sheets-Sheet 3

INVENTOR.
RICHARD C. TALBOT

BY

Hill, Sherman, Meroni, Gross & Simpson
ATTORNEYS

Dec. 13, 1966 R. C. TALBOT 3,290,859

TRAY LOADER

Filed Feb. 19, 1964 18 Sheets-Sheet 4

INVENTOR.
RICHARD C. TALBOT

BY
Hill, Sherman, Meroni, Gross & Simpson
ATTORNEYS

TRAY LOADER

Filed Feb. 19, 1964

INVENTOR.
RICHARD C. TALBOT

BY

Hill, Sherman, Meroni, Gross & Simpson

ATTORNEYS

Dec. 13, 1966

R. C. TALBOT 3,290,859

TRAY LOADER

Filed Feb. 19, 1964

18 Sheets-Sheet 6

INVENTOR.
RICHARD C. TALBOT

BY
Hill, Sherman, Meroni, Gross & Simpson
ATTORNEYS

INVENTOR.
RICHARD C. TALBOT
BY
Hill, Sherman, Meroni, Gross & Simpson
ATTORNEYS

Dec. 13, 1966 R. C. TALBOT 3,290,859

TRAY LOADER

Filed Feb. 19, 1964 18 Sheets-Sheet 8

INVENTOR.
RICHARD C. TALBOT
BY Hill, Sherman, Meroni, Gross & Simpson
ATTORNEYS

Dec. 13, 1966 R. C. TALBOT 3,290,859

TRAY LOADER

Filed Feb. 19, 1964 18 Sheets-Sheet 9

INVENTOR.
RICHARD C. TALBOT
BY
Hill, Sherman, Meroni, Gross & Simpson
ATTORNEYS

*INVENTOR.*
RICHARD C. TALBOT

BY Hill, Sherman, Meroni, Gross & Simpson

ATTORNEYS

INVENTOR.
RICHARD C. TALBOT
BY
Hill, Sherman, Meroni, Gross & Simpson
ATTORNEYS

TRAY LOADER

INVENTOR.
RICHARD C. TALBOT
BY
Hill, Sherman, Meroni, Gross & Simpson
ATTORNEYS

INVENTOR.
RICHARD C. TALBOT

BY
Hill, Sherman, Meroni, Gross & Simpson
ATTORNEYS

INVENTOR.
RICHARD C. TALBOT
BY
Hill, Sherman, Meroni, Gross & Simpson
ATTORNEYS

INVENTOR.
RICHARD C. TALBOT

BY Hill, Sherman, Meroni, Gross & Simpson

ATTORNEYS

Dec. 13, 1966 R. C. TALBOT 3,290,859

TRAY LOADER

Filed Feb. 19, 1964 18 Sheets-Sheet 16

INVENTOR.
RICHARD C. TALBOT
BY
Hill, Sherman, Meroni, Gross & Simpson
ATTORNEYS

INVENTOR.
RICHARD C. TALBOT
BY
Hill, Sherman, Meroni, Gross & Simpson
ATTORNEYS

Dec. 13, 1966 R. C. TALBOT 3,290,859

TRAY LOADER

Filed Feb. 19, 1964 18 Sheets-Sheet 18

INVENTOR.
RICHARD C. TALBOT

BY

ATTORNEYS

United States Patent Office 3,290,859
Patented Dec. 13, 1966

3,290,859
TRAY LOADER

Richard C. Talbot, Skokie, Ill., assignor to Peters Machinery Company, Chicago, Ill., a corporation of Illinois Filed Feb. 19, 1964, Ser. No. 345,902
36 Claims. (Cl. 53—160)

This invention relates to improvements in apparatus for counting and loading cookies into trays and the like.

The machine of the present invention is generally arranged to form a continuation of a sandwich machine like that shown and described in Patent No. 2,936,557 which takes cookies and places a creme filler between each two cookies to form sandwiches. The machine of the present invention counts the sandwiched cookies discharged from the sandwiching machine and separates the cookies into groups and automatically loads the cookies into trays, boxes and other containers commonly used to package cookies. The machine, of course, may count, separate and load various forms of cookies and need not necessarily be used to count and package sandwiched cookies.

A principal object of the present invention is to provide an apparatus receiving cookies from a conveyor in a continuous flow and counting the cookies and separating the counted cookies into uniform groups and then automatically loading the cookies in a continuous automatic operation.

Another object of the invention is to provide an improved form of conveyor for conveying, counting and separating cookies into groups, and arranged with a view toward utmost simplicity and efficiency in construction and operation.

A further object of the invention is to provide a cookie separating and counting conveyor in cookie receiving relation with respect to a faster traveling conveyor of a sandwiching machine, in which a simple and improved form of retarding means is provided to retard travel of the cookies as they are picked up by the counting and separating conveyor.

Still another object of the invention is to provide an improved form of transfer conveyor transferring counted rows of cookies from a counting conveyor to a packaging station, in which the transfer conveyor is driven by a simplified form of drive, placing a dwell in the travel of the conveyor to accommodate cookies to be released therefrom for packaging.

A further object of the invention is to provide an improved form of transfer conveyor and cookie support and guide means, transferring the cookies from a counting conveyor and guiding and supporting the cookies while conveyed by the conveyor, and so arranged as to release the cookies for packaging during a dwell in travel of the conveyor.

A still further object of the invention is to provide a simple and improved form of intermittent drive mechanism for driving conveyors and the like to place a dwell in the travel of the conveyor all while the drive mechanism is continuously operating.

A still further object of the invention is to provide a novel form of cookie support supporting cookies while transferred from a counting station, in which means are provided for moving the support out of supporting relation with respect to the cookies when the cookies are brought into position for loading.

A further object of the invention is to provide a simplified and improved form of drop chute for loading falling rows of cookies into a tray and the like, and having a movable wall portion movable into the tray as a row of cookies is dropped thereinto and forming a guide for a row of cookies dropping into the tray and retaining the cookies in position in the tray during the loading operation.

A further object of the invention is to provide a novel and improved form of control means for controlling the travel of cartons along a conveyor, positioning certain grups of cartons in cookie receiving relation with respect to a transfer conveyor and drop chute, and separating certain other groups of cartons to accommodate the loading of the cartons in steps of multiple rows of cookies, with one row in an advance carton and the next adjacent row in a trailing carton during certain cycles of the cookie loading operation.

These and other objects of the invention will appear from time to time as the following specification proceeds and with reference to the accompanying drawings wherein.

*Machine in general*

Figure 1:
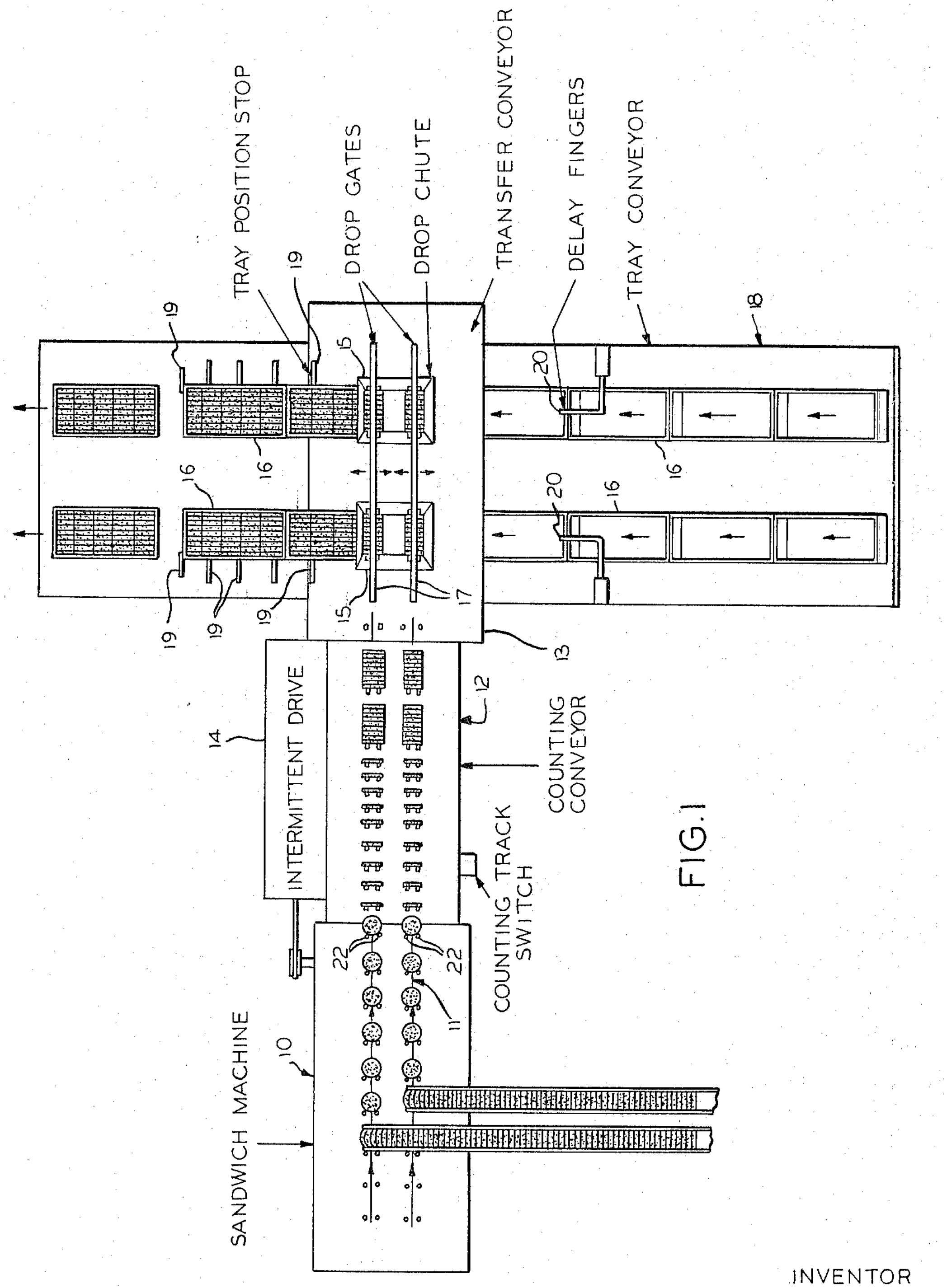
FIGURE 1 is a schematic plan view diagrammatically showing a cookie counting and loading apparatus constructed in accordance with the principles of the present invention in association with a sandwiching machine.

In the embodiment of the invention diagrammatically illustrated in FIGURE 1 of the drawings, I have shown a sandwiching machine 10, a conveyor 11, 11 conveying sandwiched cookies to a separating and counting conveyor 12 conveying the cookies from the conveyor 11 in rows and separating the cookies into uniformly counted groups in accordance with the width of the cartons or trays to be loaded.

The cookies are picked from the counting conveyor by an intermittently driven transfer conveyor driven by an intermittent drive 14, providing a dwell in the travel of the transfer conveyor to accommodate the cookies to drop through drop chutes 15, 15 onto cartons or trays 16, 16 traveling along a tray conveyor 18.

The groups of cookies picked up by the transfer conveyor are guided in a manner which will hereinafter more clearly appear as this specification proceeds and ride along support rails 17, 17 of a drop gate. The drop gate and rails 17, 17 are moved to one side during a dwell in the travel of the transfer conveyor out of supporting relation with respect to the cookies to accommodate the cookies to drop through the drop chutes 15 guiding the cookies to fall into the trays in rows, two rows of cookies falling into each of two side by side trays 16, 16 during each dropping operation.

The trays are positioned beneath the drop chutes 15, 15 by movable stops 19, 19, arranged to retain the trays from movement along the tray conveyor 18 during a cookie loading operation and to space the trays of loaded cookies as discharged from the tray conveyor.

It should here be understood that where single row trays are loaded, the trays may travel along the conveyor 18 in side by side relation, and where multiple row trays are loaded the trays may travel along the conveyor to the drop chutes 15 in end to end relation with respect to each other or in side by side relation, depending upon the width and type of tray being loaded. Where multiple row trays, such as, five row trays are loaded the advance end of the advance tray is stopped under an associated drop chute by a stop or positioner 19 to accommodate two rows of cookies to drop into said tray. The tray is then advanced a distance of two rows of cookies and two additional rows of cookies are dropped thereinto just behind the first two rows of cookies.

During a third dropping operation, one row of cookies drops into the advance tray to fill the tray while a next adjacent row of cookies drops into the advance end of the rearwardly disposed tray. Filling of the next adjacent rearward tray is then completed in two more dumping operations.

A pair of laterally spaced delay or retainer finger 20, 20 are provided to engage the inside of the trailing or rear end of the next succeeding or third cartons moving along the tray conveyor and to hold these cartons from movement and place a gap between the third cartons and the second cartons and position the third cartons to be loaded, first with two rows of cookies at the advance end thereof, to be completely loaded in the manner just described. The tray stops, the positioners 19 and the retaining or delay fingers 20 are operated in timed relation with respect to each other and in timed relation with respect to travel of the counting conveyor 12 and the transfer conveyor 13 by drive and control mechanism driven from a single source of power, shown in FIGURE 2 as being a chain and sprocket drive 21 driven from the sandwich conveyor 11. The source of power, however, may be an electric motor separate from the sandwich machine, or may be any other conventional source of power.

*Sandwich conveyor and retarder*

Figures 3, 4:
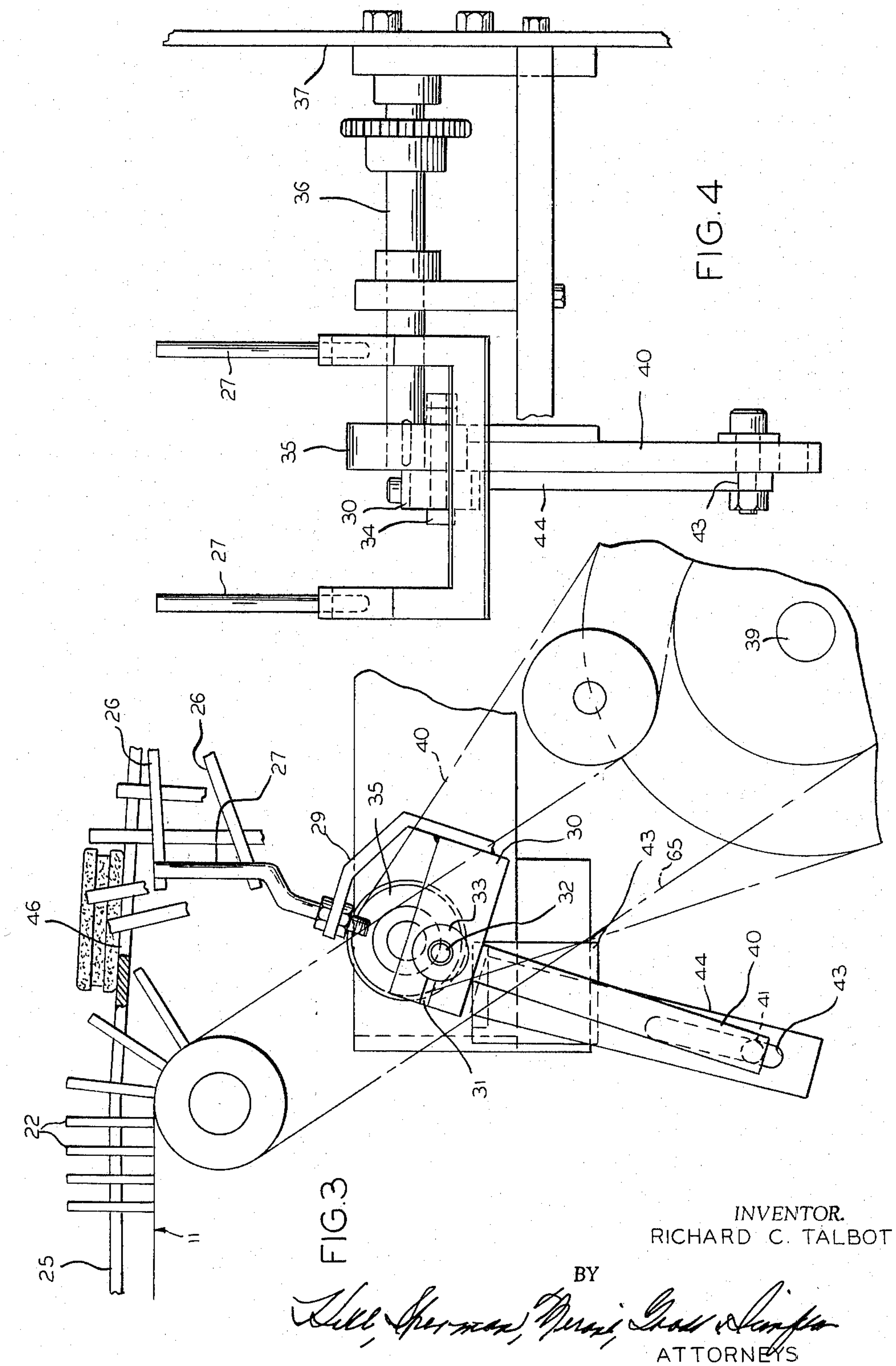
FIGURE 3 is a fragmentary side view with certain parts in section showing the sandwich retarder at entering end of counting conveyor.
FIGURE 4 is a fragmentary detail front elevational view of the sandwich retarder with certain parts broken away and other parts in transverse section.
Figure 5:
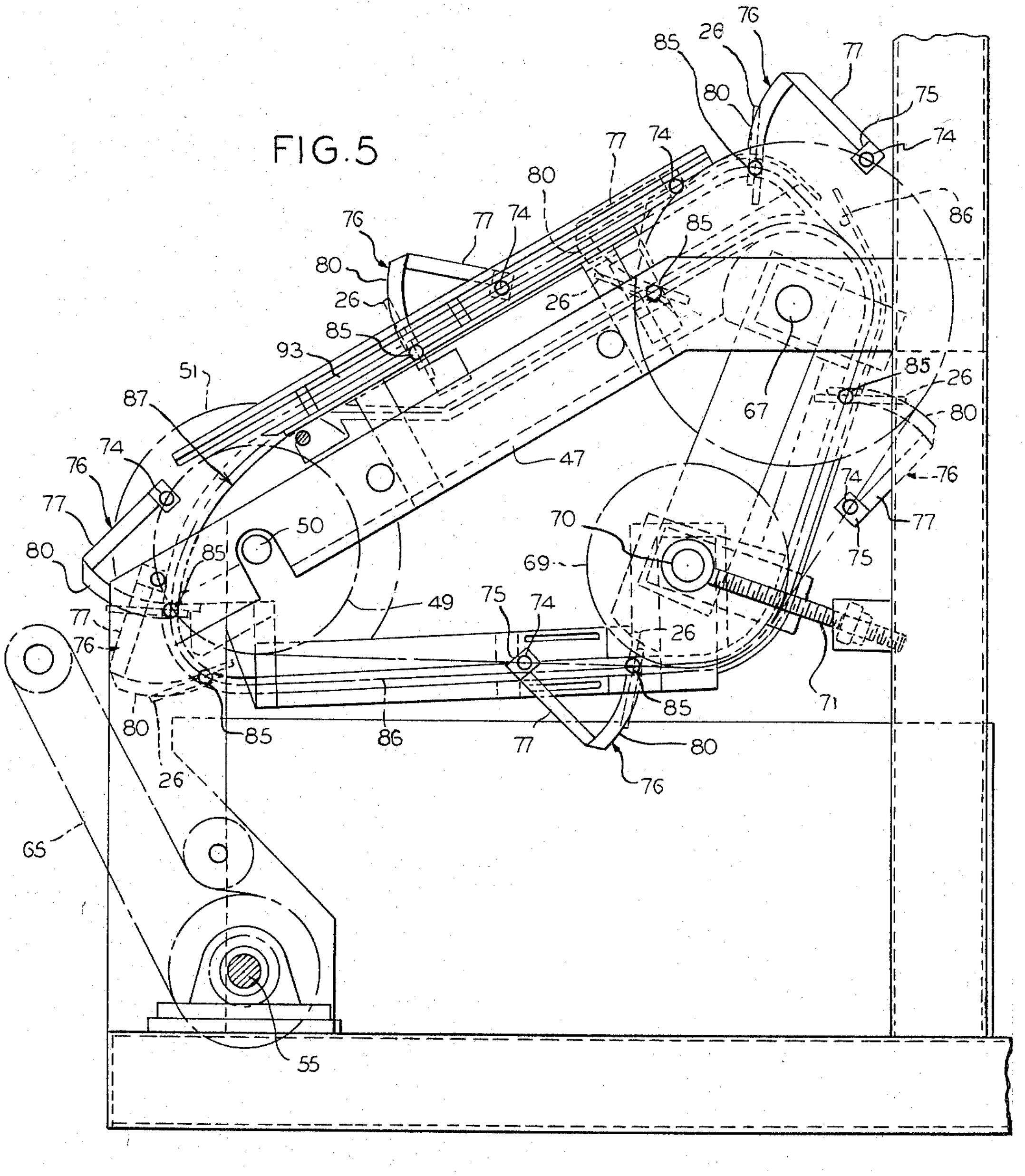
FIGURE 5 is a view in side elevation of a counting conveyor constructed in accordance with the principles of the present invention, with certain parts broken away and certain other parts shown in section.

The sandwich conveyor 11, as diagrammatically shown in FIGURE 3 includes pairs of upright fingers or flights 22, 22 for each row of cookies, spaced along a conveyor chain 23 passing about a sprocket 24 driven from the chain and sprocket drive 21 and extending upwardly from said conveyor chain. The pairs of flights 22, 22 are longitudinally spaced apart distances greater than the diameter of a cookie or sandwich and extend upwardly along opposite sides of a plate 25, supporting the sandwiches to engage the edge of a cookie and impel the cookie to be picked up by conveying fingers 26 of the counting conveyor 12, and carried upwardly by said conveyor and separated into uniformly counted groups of cookies during upward travel thereof.

A means is provided to retard travel of the sandwiches as they reach the counting conveyor and are picked up by the fingers 26, 26 thereof, which is shown in FIGURES 3 and 4, as comprising a pair of retarding fingers 27, 27, one retarding finger being associated with each row of sandwiches and being disposed intermediate associated upright conveying fingers 22, 22 and movable along a slot 46 extending along the center of the plate 25.

As shown in FIGURES 3 and 4 of the drawings, the retarding fingers 27 are mounted on a bracket 29 and project upwardly therefrom. The bracket 29 in turn is mounted on the rear face of a block 30 and extends upwardly therefrom and angularly forwardly over said block. The block 30 has a split forward end portion 31 and is clamped to a roller 33 suitably journalled on a transverse shaft 34, mounted on and extending outwardly of a roller 35. The roller 35 is keyed or otherwise secured to a transverse shaft 36 suitably journalled on a frame 37 for the counting conveyor, and driven from a main drive shaft 39 through a chain and sprocket drive 40.

Movement of the retarding fingers 27 is controlled to effect movement of said fingers in an orbital path from a forwardmost position A shown in FIGURE 3 to a rearwardmost position B at the receiving end of the counting conveyor 10 by means of a control leg 41 depending from the block 30 and having a pin or roller 42 at its lower end guided for movement along a slot 43 in a control member 44. The control member 44 is fixed to a block 45, secured to a cross frame member 46 and extending angularly downwardly from said block and cross frame member. The control member 44 may be secured to the block 45 in a suitable manner, and its angle may be varied to vary the path of travel of the retarding fingers 27. The retarding fingers 27 thus move in a generally elliptical path along the slot 46 in the cookies support plate 25, extending between the fingers 22, 22 and retard travel of the cookies to be picked up one by one by the fingers 26 of the counting conveyor 12.

*Counting conveyor*

The counting conveyor 12, as shown in FIGURES 5 through 10 includes a pair of spaced endless chains 48 movable along the insides of side frame members 47 for the conveyor, and trained about drive sprockets 49 at the receiving end of the conveyor. The drive sprockets 49 are keyed or otherwise secured to a transverse shaft 50 at the receiving end of the conveyor.

The transverse shaft 50 is suitably journalled in the side frame members 47 and has a drive sprocket 51 keyed or otherwise secured to an outer end thereof. The drive sprocket 51 is driven from an endless chain 53, meshed with and driven from a sprocket 54 on a transversely extending shaft 55. The endless chain 53 is also trained about a sprocket 56 on a transverse shaft 57 for driving the intermittent drive mechanism 14, intermittently driving the transfer conveyor 13, in a manner which will hereinafter more clearly appear as this specification proceeds. A suitable tension idler 61 is provided to maintain tension on the endless chain 53 while a direction changing idler 62 is provided to partially wrap the endless chain 53 about the drive sprocket 56. The shaft 55 and sprocket 54 in turn are driven through a chain and sprocket drive 65 driven from the chain and sprocket drive 21.

The conveyor chains 48 extend upwardly along the insides of the side frame members 47 and change their directions at the upper limits of their travel about direction changing idler sprockets 66, rotatably mounted on a transverse shaft 67, suitably journalled in the side frame members 47. From thence the endless chains pass downwardly around take up idler sprockets 69 to and along the insides of the side frame members 47 to the drive sprockets 49. The take up idler sprockets 69 are mounted on a transverse shaft 70, and tension is taken up on the chains 48 or relieved from said chains by a conventional form of screw type of take up 71, which need not herein be shown and described in detail since it may be of any well known form.

The conveyor chains 48 may be well known forms of roller type chains in which the links are formed by parallel spaced straps 72 lapping parallel straps 73 and pivotally connected together in their region of lap by pivot pins 74. The pivot pins 74 extend inwardly of the inner straps 72 and each inwardly extending extension of a pivot pin 74 forms a pivotal mounting for a connecting end 75 of a flight 76.

The flights 76 of the counting conveyor have legs 77 extending angularly inwardly and outwardly towards the outer sides of outer guide plates 79 for the cookies. The legs 77 terminate at their inner ends into arcuate arms 80 extending angularly downwardly along the outer sides of the outer guide plates 79, when the flights are in their upwardly extended positions, and terminate at their lower ends into transverse flight structures 81, extending tranversely of the conveyor beneath the guide plates 79 and movable along the bottoms thereof. Each transverse flight structure 81 has two pairs of spaced conveying fingers 26, 26 extending upwardly therefrom along opposite sides of a material carrying strip 82, extending for the length of the conveyor, when the flights are in their upwardly extended positions. The pairs of fingers 26, 26 also extend up along the inner side of the outer guide plate 79 and along a facing side of an inner guide plate 83, for conveying the cookies in the spaces between said guide plates.

Figures 6, 7:
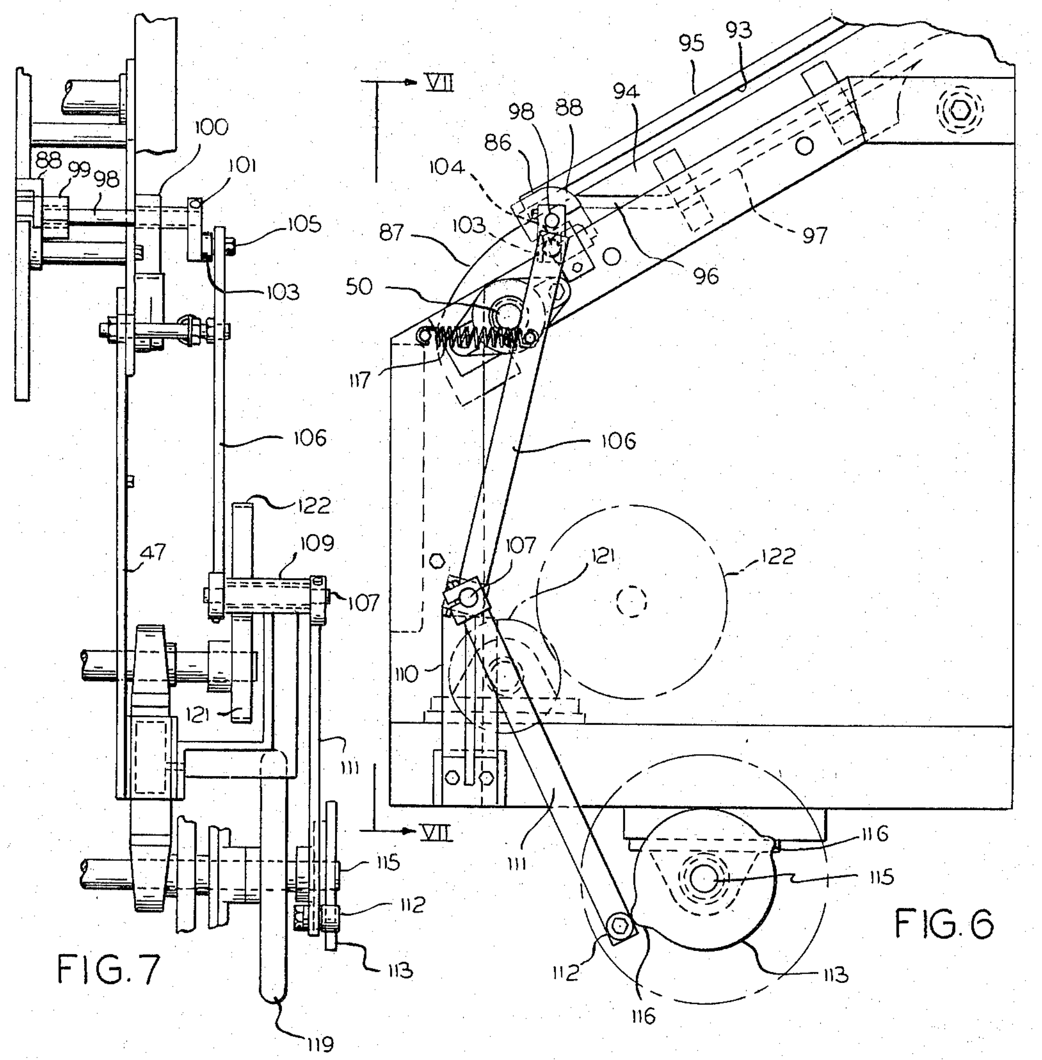
FIGURE 6 is a fragmentary longitudinal sectional view showing certain details of the means for controlling counting and separation of the cookies in groups.
FIGURE 7 is a sectional view taken substantially along line VII—VII of FIGURE 6.
Figure 9:
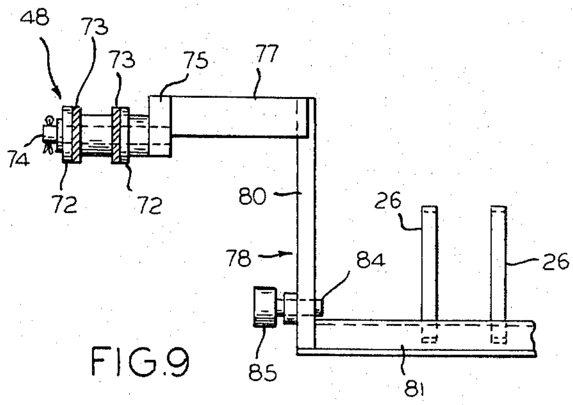
FIGURE 9 is a fragmentary side view of a conveyor flight of the counting conveyor.

The arcuate arm 80 of each flight, on one side of the flight, has a pin 84 mounted therein and projecting outwardly therefrom. The pin 84 has a roller 85 rotatably mounted on its outer end. As the flight 76 turns about the idler sprocket 66, the roller 85 enters a guide track 86 leading downwardly along the rear of the conveyor around the idler 67 and forwardly along the lower run of the conveyor to an arcuate guide 87. The roller 85 is guided along the guide track 86 and arcuate guide 87 as the flight turns about the drive sprocket 49. The guide 87 terminates at its upper end into a switch 88. The switch 88 has a pair of parallel spaced plates 89 and 90 etxending inwardly of an outer vertical plate 91, having a pivot pin 92 extending outwardly therefrom. The pivot pin 92 is transversely pivoted to a plate 93, forming a part of the frame structure for the conveyor. The upper surface of the bottom plate 89 of the switch 88, forms a continuation of the surface of the arcuate guide track 87, as shown in FIGURE 6, and of a rectilinear guide track 93 extending angularly upwardly along the conveyor frame structure to a position adjacent the idler sprocket 66. The guide track 93 is in the form of a slot formed between two vertically spaced plates 94 and 95, suitably secured to the conveyor frame structure, the spacing of which is equal to the spacing between the plates 89 and 90 of the switch 88.

When the rollers 85 move upwardly along the arcuate guide 87 and guide track 93, the pins 26, 26 of the flights 76 etxend upwardly between the guides formed by the guide plates 79 and 83 along opposite sides of and above the material carrying surfaces of the support strips 82, 82.

The switch 88 cooperates with a switch track 96 to effect the withdrawal of certain fingers 26, 26 beneath the level of the material carrying surfaces of the strips 82, 82. The switch track 96, extends angularly downwardly from the track switch 88 and terminates into a track 97 spaced beneath but parallel to the track 93 a distance sufficient to recess the tops of the fingers 26, 26 beneath the material carrying surfaces of the sandwich or cookie carrying strips 82, 82.

The track switch 88 is mounted on the inner end of a transverse shaft 98 by a coupling 99, fitting over the pin 92. The shaft 98 is suitably journalled in a bearing support 100 mounted on the inner side of a side frame member 47 and extending upwardly therefrom, (FIGURE 7). A crank 101 is secured to the outer end of the shaft 98 and depends therefrom and has parallel spaced ribs 103, 103 extending outwardly therefrom for a portion of the length thereof, and forming an outwardly opening cam slot for a cam roller 104, on the inner end of a pin 105. The pin 105 is mounted on the upper end portion of an upright lever 106 mounted on and extending upwardly from a transverse rock shaft 107, journalled in a bearing support 109, supported on the upper end of an upright 110, suitably mounted on the frame for the conveyor and extending upwardly therefrom.

A rocking arm 111 is secured to the rock shaft 107 on the outside of the bearing support 109 and depends therefrom and has a roller 112 rotatably mounted on its lower end portion and forming a follower engaging the peripheral surface of a cam 113, keyed or otherwise secured to a camshaft 115. The cam 113 has two diametrically opposed lobes 116 thereon, engaging the follower 112 and rocking the rocking arms 111 and 106 to operate the track switch 88 to guide the rollers 85 to travel along the track 93 and hold their associated flights 76 and the conveying pins 26, 26 in upright conveying positions extending about the material carrying strips 82, 82, twice during each revolution of the shaft 115. A tension spring 114 is connected between the lever 106 and a fixed connector 118 on the conveyor frame structure, to maintain the follower 112 in engagement with the face of the cam 113.

It may be seen from the foregoing that the track switch 88 is normally in position to guide the rollers 85 along the switch track 96 and the continuing rectilinear track 97 to recess the fingers 26, 26 beneath the material carrying surfaces of the material carrying strips 82, 82. Twice during each revolution of the cam 113, however, the switch 88 will switch a roller 85 along the track 93 to hold the associated fingers 26, 26 to extend above the material carrying surfaces of the strips 82, 82 and convey groups of cookies along said strips. Thus, the number of cookies in a group, conveyed along the material carrying strips 82, 82 depends upon the frequency of operation of the switch 88 and the speed of rotation of the cam 113 and the number of lobes on said cam. The cam may be provided with one lobe where only one group of cookies is dropped at a time, as where the group may contain ten or more cookies in a row. The speed of rotation of the cam may readily be varied in accordance with the number of cookies desired to count and convey for packaging in an individual group. A hand wheel 119 is shown as being mounted on the cam shaft 115 to enable the cam to be turned by hand when desired, to thereby enable the cam and switch 88 to be properly positioned when calibrating the machine for a particular counting operation.

The cam shaft 115 extends across the frame of the machine and is suitably journaled therein, and is driven from the shaft 55 through a pair of meshing spur gears 121 and 122. The spur gear 122 is on a shaft 123 on the same side of the machine as the cam 113. The cam shaft 115 is driven from the spur gear 122 and shaft 123 by a chain and sprocket drive 124. The spur gear 122 is removably mounted on the shaft 123 to enable a gear of different pitch to be placed on said shaft in mesh with the gear 121 and to thereby enable the gear ratio between the shafts 55 and 123 to be readily changed to vary the speed of rotation of the cam shaft 115 and the cam 113 and thereby vary the spacing between the flights and fingers 26, 26 switched to ride along the track 93 and be retained in material carrying positions, and the count of sandwiches in each group conveyed for loading.

The present counting conveyor by varying the gear ratio in the drive to the cam shaft 115, by interchanging the gear 122, may count and separate into groups, sandwiches from 5 to a group up to 21 sandwiches in a group. The high count of 21 sandwiches to a group is the optimum number of sandwiches that it is practical to pack for sale to the retail trade, although it is conceivable that the counting conveyor may readily be adapted to count and separate any number of sandwiches desired. The cam shaft 115 is driven from the shaft 123 through a chain and sprocket drive 124.

*Transfer conveyor*

The transfer conveyor 13 is arranged to transfer the rows of cookies from the counting conveyor to the drop gates 17 and convey the cookies therealong to be dropped in groups through the drop chutes 15 into the trays 19, upon lateral movement of the drop gates out of supporting relation with respect to the cookies.

Figure 10:
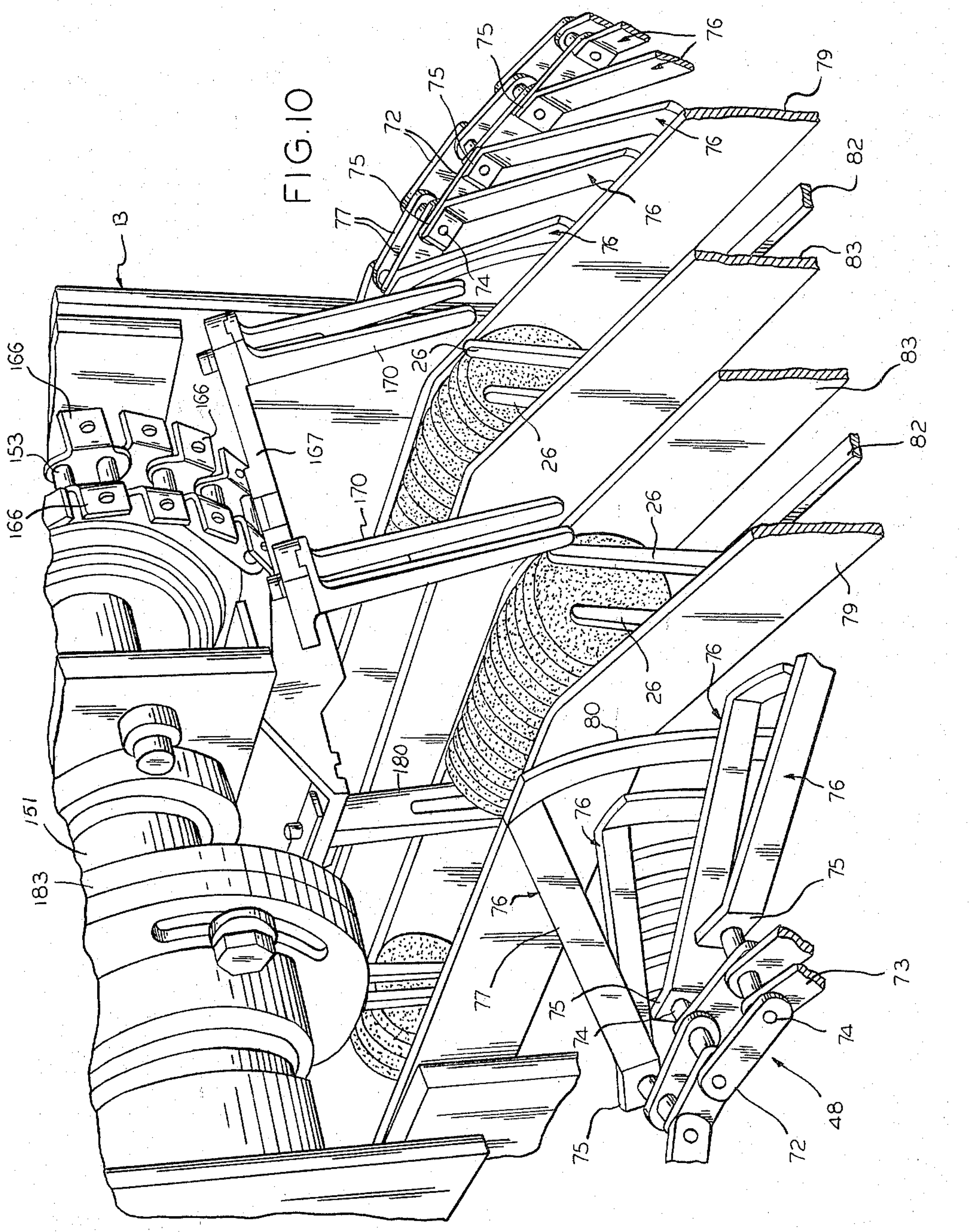
FIGURE 10 is a perspective view looking at the discharge end of counting conveyor and the entering end of transfer conveyor.
Figure 13:
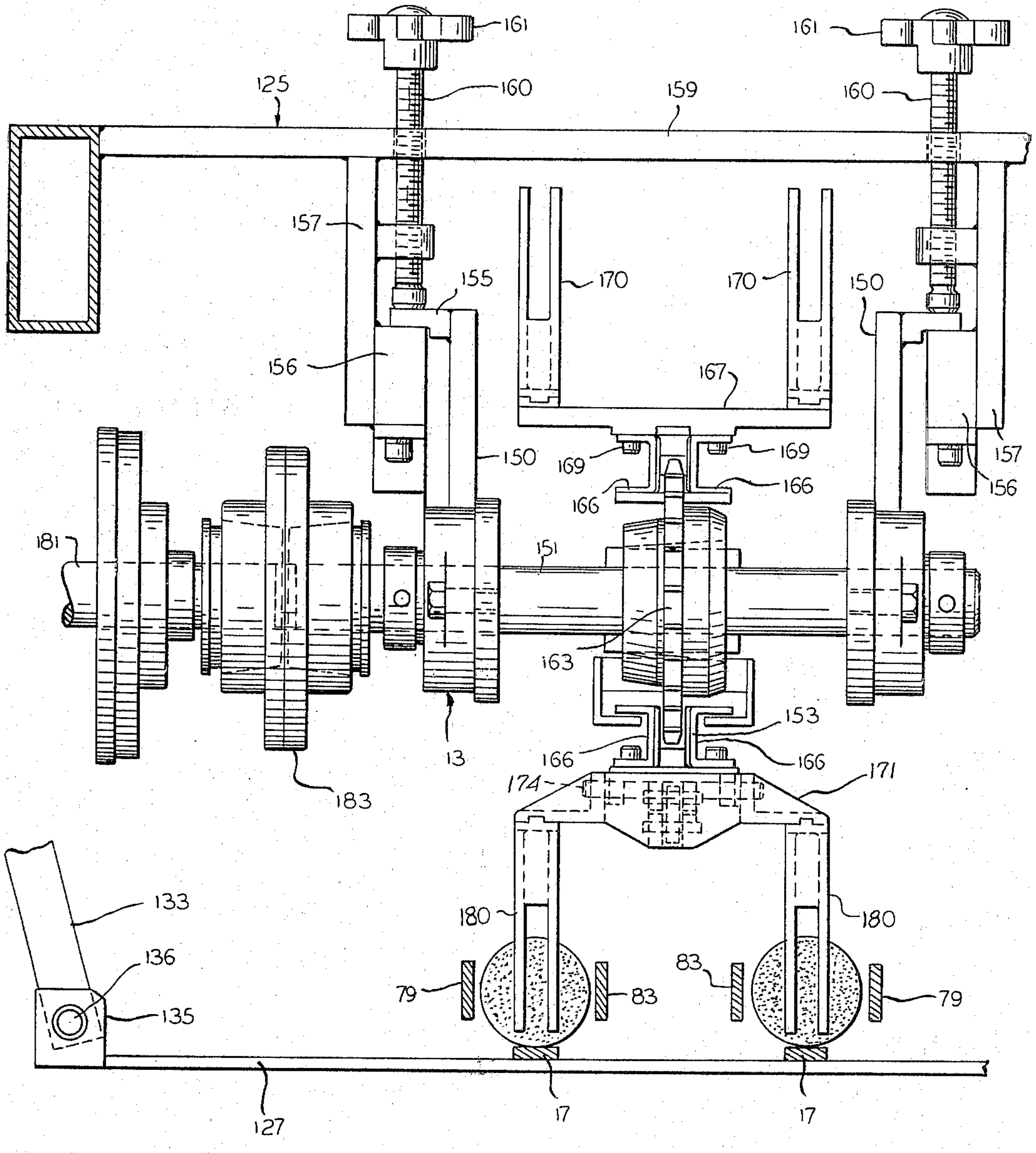
FIGURE 13 is an enlarged end view of the transfer conveyor.
Figure 14:
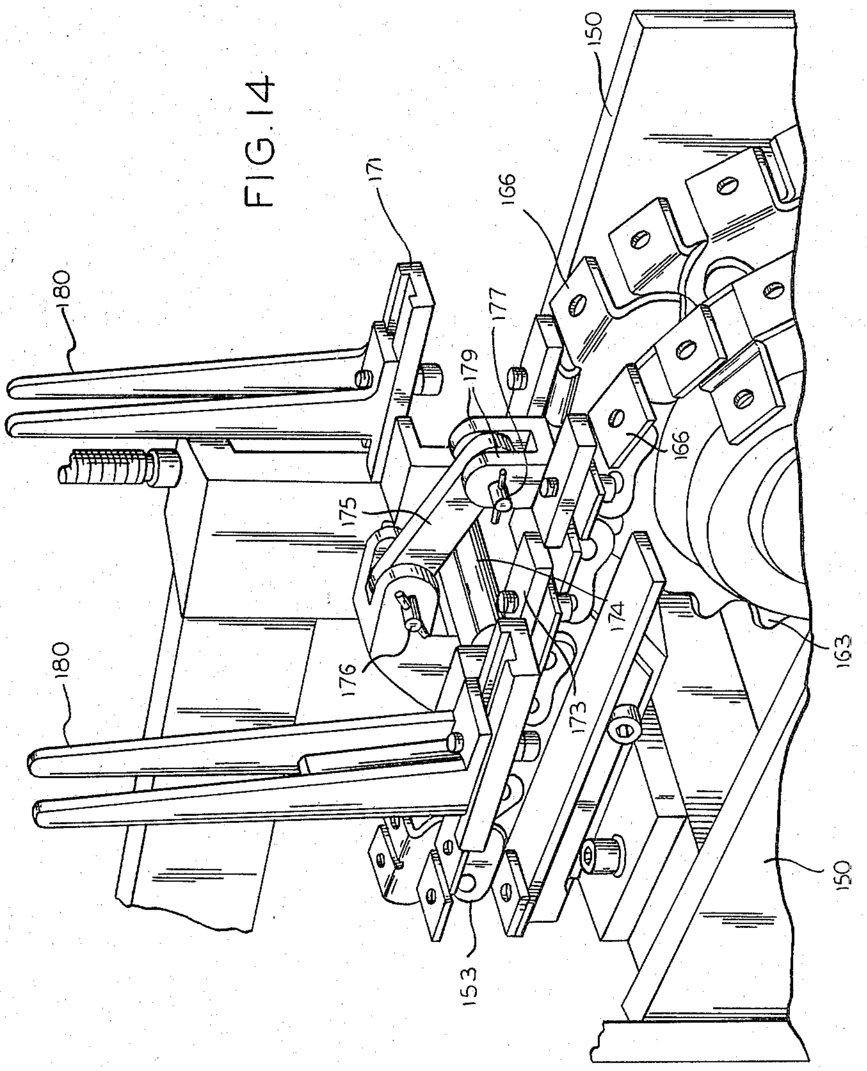
FIGURE 14 is a perspective view showing a portion of the transfer conveyor, and a retainer flight therefor.

As shown in FIGURES 10 and 13, the side guides 79, 79 and 83, 83 at the upper end of travel of the counting conveyor extends across a frame structure 125 having the side frame members 47, 47 extending forwardly therefrom, and forming a support for the transfer conveyor 13 and the tray conveyor 18. The side guides 79, 79 and 83, 83 extend along opposite sides of the drop gates 17, 17, shown as being in the form of material carrying strips and support the cookies or sandwiches while being conveyed by the transfer conveyor to dumping stations.

Figure 16:
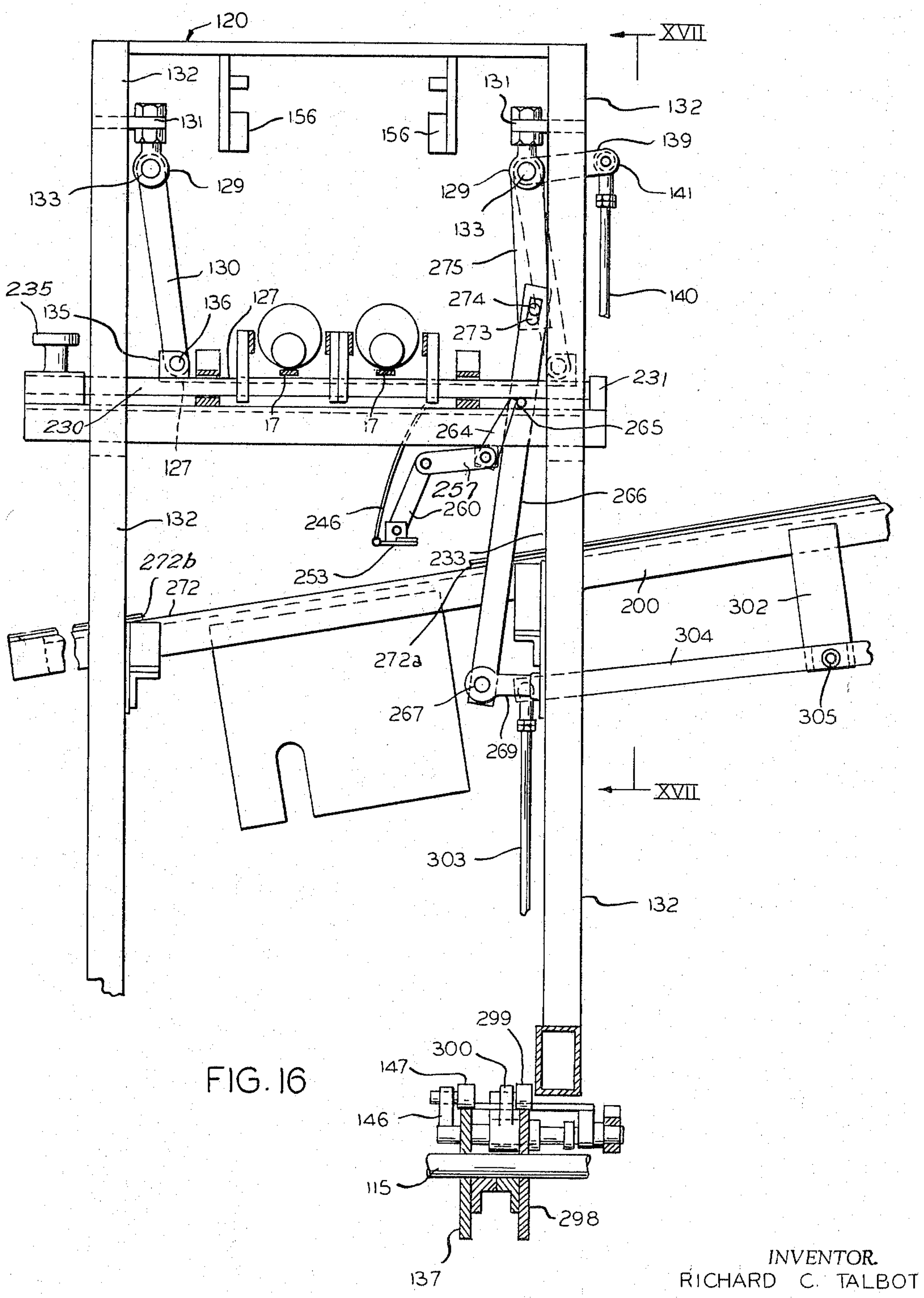
FIGURE 16 is a fragmentary transverse sectional view illustrating the mechanism for operating the drop gate and the retaining wall of the drop chute.

The drop gates 17, 17 are a part of a laterally movable drop gate carriage 127. The drop gate carriage 127 is suspended from bearing supports 129, 129 on parallel links 130, 130 for movement transversely of the transfer conveyor 13. The bearing supports 129 are shown in FIGURE 16 as being in the form of screw eyes suspended from lips 131 extending inwardly of side frame members 132, 132 of the frame structure 125. Shafts 133 are journalled in aligned bearing supports 129 and form mountings for the parallel links 130, 130. The parallel links 130, 130 are pivotally mounted at their lower ends on bearing blocks 135 extending upwardly of the carriage 127, on transverse pivot pins 136.

The drop gate carriage 127 is moved back and forth in timed relation with respect to travel of the transfer conveyor 13, to drop two rows of uniform groups of cookies through the drop chutes 15, 15 into trays 16, 16 by operation of a cam 137 on the cam shaft 115, spaced inwardly of the cam 113 on the insides of the side frame members 47, 47.

Figures 15, 17:
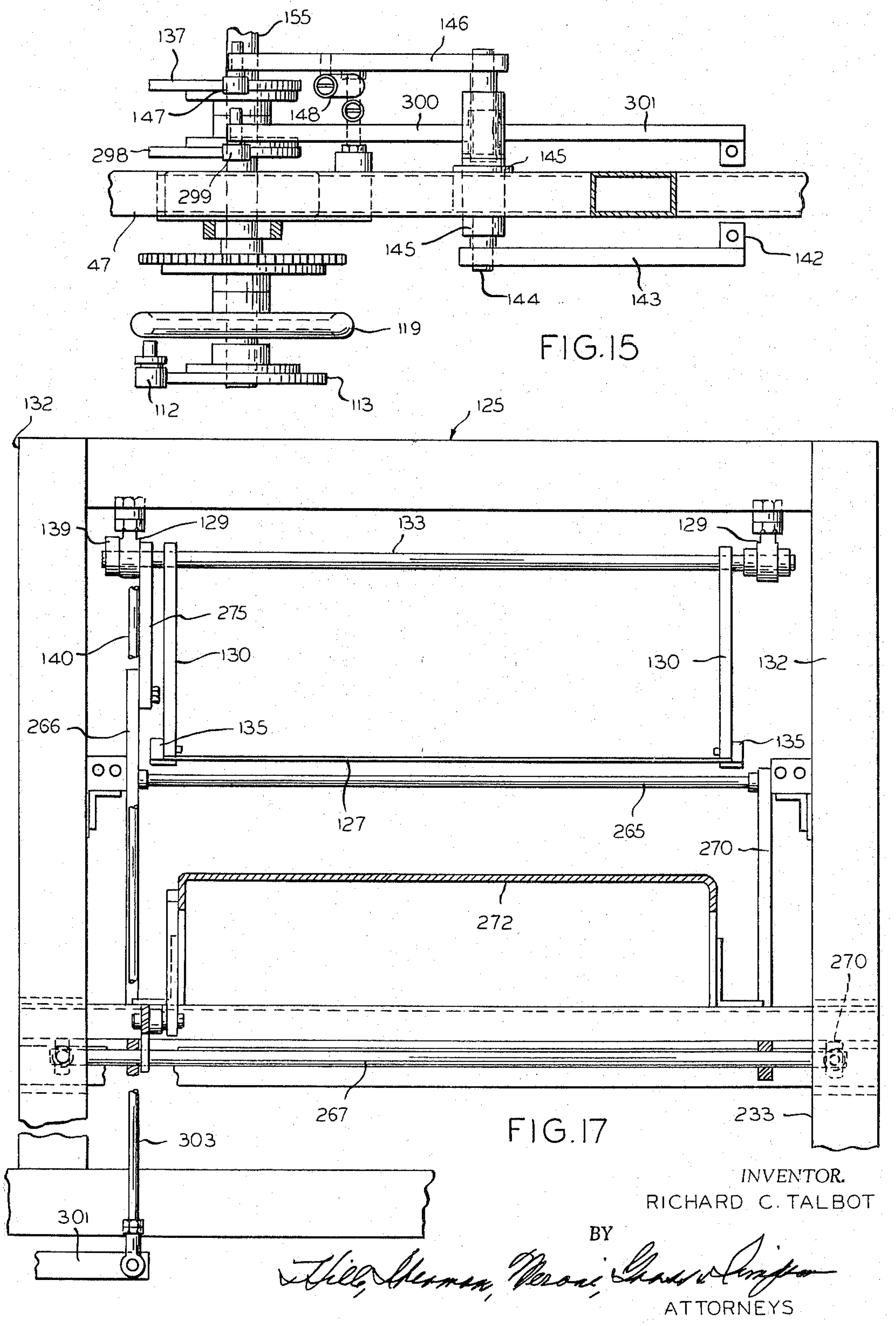
FIGURE 15 is a partial fragmentary horizontal sectional view looking downwardly on the cam shaft and showing the cams and part of the operating levers for actuating the drop gate and the mechanism for controlling travel of the trays along the tray conveyor.
FIGURE 17 is a side view looking generally along line XVII—XVII of FIGURE 16 and showing certain other details of the drop gate support and the mechanism for operating the drop gate, not shown in FIGURE 16.

As shown in FIGURE 16 a crank arm 139 is secured to the right hand shaft 133 and projects outwardly therefrom to the outside of the associated side frame member 132. A link 140 is pivoted to the outer end of the crank 139 on a pivot pin 141 and depends therefrom. The lower end of the link 140 is shown in FIGURE 15 as having a connector 142 thereon, pivotally mounted on the outer end of a lever 143. The lever 143 is in turn mounted on the outer end of a transverse shaft 144 rockably journalled in a bearing support 145. The opposite end of the transverse shaft 144 from the lever arm 143 has a lever arm 146 secured thereto and extending in an opposite direction from the lever arm 143, along the inner side of the cam 137. A follower 147 mounted on the free end portion of the lever arm 146 rides along the peripheral surface of the cam 137 and is biased into engagement with the peripheral surface of said cam by a tension spring 148. The profile of the cam 137 is such as to move the drop gates 17 to release groups of cookies or sandwiches to the drop chutes 15, 15, to be loaded onto adjacent trays 16, 16 as the cookies pass over said drop chutes into aligned relation with respect thereto it being understood that the speed of rotation of the cam 137 is varied by changing of the drive ratios to the cam shaft by interchanging the spur gear 122.

Figure 2:
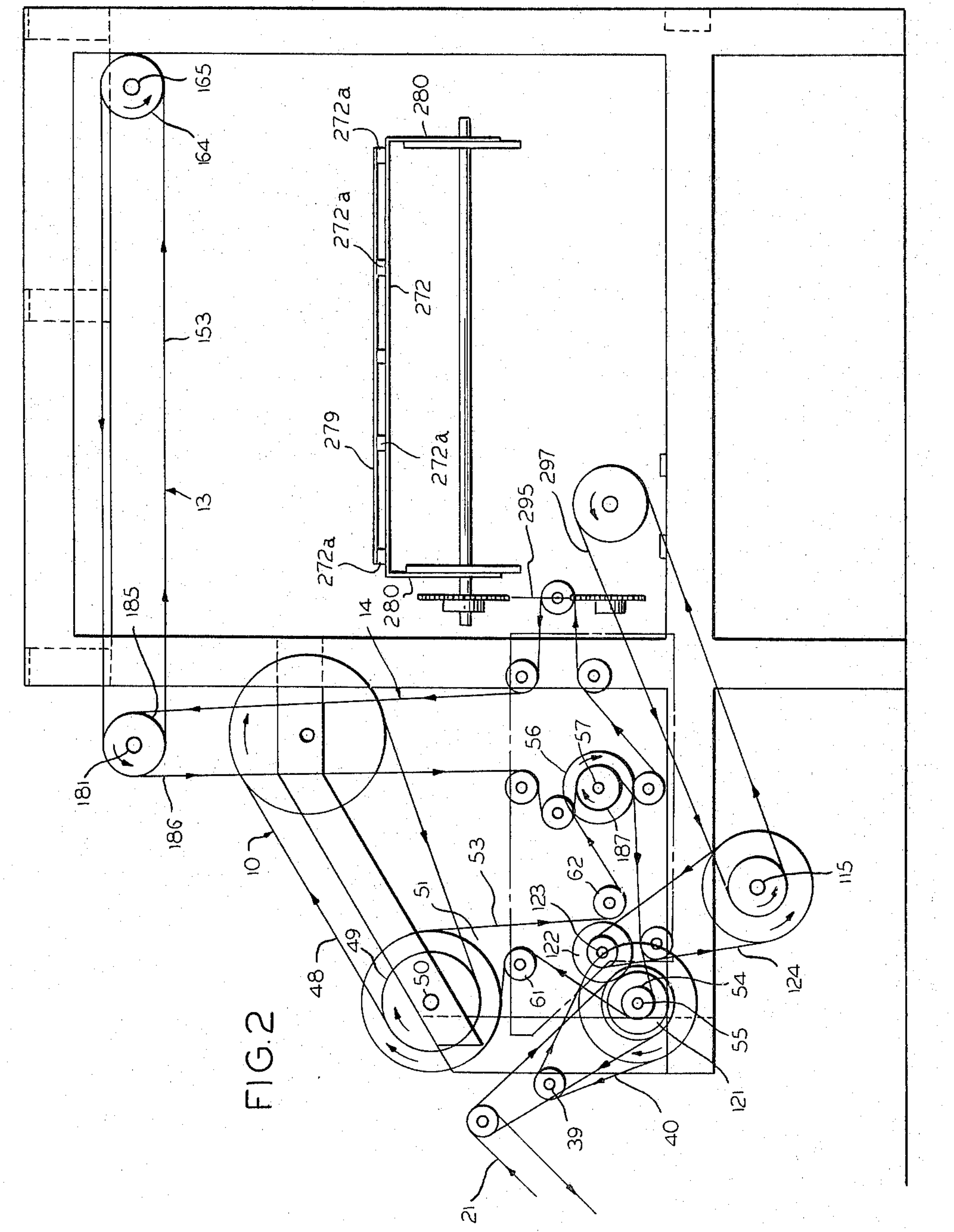
FIGURE 2 is a diagrammatic view illustrating the drive to various parts of the machine.

The transfer conveyor 13 includes parallel spaced generally vertically extending side frame members 150, 150 forming bearing supports for a front drive shaft 151 and a rear idler shaft 165 (FIGURES 2 and 13). The side frame members 150, 150 are suitably connected together between the upper and lower runs of a conveyor chain 153, and have flanges 155, 155 extending outwardly of their upper margins. The flanges 155, 155 rest on blocks 156, 156 welded or otherwise secured to the inner sides of plates 157, 157 depending from cross frame members 159 of the frame structure 127, and welded or otherwise secured to said cross frame members. Clamp screws 160, 160 are threaded in lugs 161, 161 extending inwardly of the plates 157 to be clamped into engagement with the top surfaces of the flanges 155, 155 and detachably hold the transfer conveyor 13 in position. The clamping screws 160 are shown as extending upwardly through the cross frame members 159 and as having hand grips 161 on the upper ends thereof.

Different transfer conveyors having different spacings of flights spaced in accordance with the counts of cookies or sandwiches to be loaded, may thus readily be substituted, where trays or cartons of other sizes are to be loaded, necessitating the increasing or decreasing of the number of cookies or sandwiches in each group of cookies or sandwiches to be loaded.

The chain 153 of the transfer conveyor 13 is trained about a drive sprocket 163 mounted on and rotatably driven from the shaft 151. Said chain has a lower run trained rearwardly beneath and between the side plate 150 to and about a rearwardly spaced idler sprocket 164 on a transverse horizontal shaft 165, diagrammatically shown in FIGURE 2. The conveyor chain 153 has a plurality of spaced attachments 166 extending outwardly of its outer side and forming mountings for flights 167. The flights 167 are secured to the attachments 166 as by machine screws 169 and extend in opposite directions equal distances from the center line of the chain 153 and are rigidly attached to the chain. The flights 167 have pusher fingers 170, 170 depending from opposite ends thereof and registering with the drop gates 17, 17 for pushing rows of cookies along said drop gates to positions above the drop chutes 15, 15.

Intermediate the flights 167, 167 are a plurality of flights 171, 171, transversely pivoted on supports 173 mounted on the attachments 166 on pivot pins 174. Movement of the flights 171 about the axes of the pivot pins 174 is controlled by a link 175 pivotally connected to the advance side of a flight 171 as by a pivot pin 176. The link 175 is pivotally connected at its free end, spaced in advance of the flight 171, by a transverse pivot pin 177, mounted in connected ears 179, 179 secured to and extending outwardly of the advance attachments 166, 166. The link 175 thus advances its flight about the axis of the pivot pin 174 and positions conveying fingers 180, 180 of said flight to clear the sandwiches or cookies, as transferred from the counting conveyor to the transfer conveyor and at the same general angle of the cookies, as they are transferred to the transfer conveyor. This compensates for changes in speed of the transfer conveyor during a dwell in travel of the conveyor during a cookie dumping operation. The flights 171, 171 thus lead the flights 167, 167 and are controlled to prevent breakage of the cookies during a change in speed of the transfer conveyor and to retain the cookies or sandwiches in uniform rows as they pass from the inclined counting conveyor and along the horizontal drop gates 17, 17 for discharge through the drop chutes 15, 15.

The shaft 151 is driven from an axially aligned shaft 181 through a coupling 183. The coupling 183 provides a detachable drive connection from the shaft 181 to the shaft 151, to accommodate the drive connection to the shaft 151 to readily be detached when changing transfer conveyors for different counts of sandwiches or cookies. The shaft 181 is driven from the intermittent drive 14 through a sprocket 185 keyed or otherwise secured to said shaft and driven from an intermittent drive chain 186 (FIGURE 2).

*Intermittent drive to transfer conveyor*

The intermittent drive chain 186 is partially wrapped about a drive sprocket 187 on the drive shaft 57, driven from the drive chain 53, driving the counting conveyor 10, and is driven from the drive sprocket 187.

The upwardly and downwardly moving runs of the drive chain 186 extend downwardly of the sprocket 185. The two runs of the chain 186 are trained about horizontally spaced idlers 188, rotatably mounted on stationary shafts 189. From the idlers 188 the chain extends horizontally in opposite directions around an idler 190 mounted on a horizontally movable carriage 191 and partially wrapping the chain 186 about the drive sprocket 187. The opposite run of the chain 186 extends from the opposite idler 188 about an idler 193, mounted on the carriage 191 for movement therewith. From the idler 193, the chain 186 extends over an idler 194 on a stationary shaft 195 and under and around an idler 196 on the stationary shaft 197 and cooperating with the idler 190 to wrap the chain 186 about the drive sprocket 187.

The carriage 191 comprises spaced parallel horizontally extending shafts or rods 199, 199, having end plates 200, 200 secured to shouldered ends thereof as by nuts 201, 201. The shafts 199 are slidably supported in slides 202 carried by transverse bars 203, supported at their inner ends in an end plate 204 and at their outer ends on an end plate 205, spaced in parallel relation with respect to the end plate 204, and suitably secured thereto. The idler sprocket 190 is mounted on a shaft 207 supported at its ends in a bracket 208 supported on the front end plate 200 and extending inwardly therefrom toward the opposite end plate. The opposite idler sprocket 193 is supported on a shaft 209, mounted at its ends on a bracket 210, supported on the inside of the associated end plate 200 and extending toward the idler sprocket 190. The idler sprockets 190 and 193 will thus move together upon movement of the carriage 191 along the slides 202.

A means is provided to move the carriage 191 back and forth along the slides 202, 202 to intermittently increase and decrease the speed of travel of the transfer conveyor 13 and to provide a dwell in the travel thereof, to accommodate the dumping of cookies therefrom. This means comprises a bellcrank 211 pivotally mounted on a shaft 212 parallel to the axes of rotation of the idler sprockets 190 and 193. The bellcrank 211 has an upright lever arm 213 having a plurality of holes 215 drilled therethrough, any of which holes may form a mounting for a pivot pin 216, connecting a drive link 217 to said bellcrank. The opposite end of the drive link 217 is connected to any one of a series of holes 219 drilled through a tongue 220 secured to and extending from the forward plate 200 towards the bellcrank 211. A pivot pin 221 is provided to detachably connect the link 217 to a selected hole 219 in the tongue 220 corresponding to the hole 215, to which the pin 216 is connected to effect a drive from the bellcrank 211 to the carriage 191, to reciprocably move said carriage and provide a dwell in travel of the transfer conveyor as the sandwiches are conveyed to selected dropping positions. The bellcrank 211 has a lever arm 223 extending angularly downwardly from the pivot pin 212 and having a follower roller 224 on its end and extending to one side thereof. The follower roller 224 extends within a cam groove 225 in a cam 226, on the opposite end of the cam shaft 115 from the cam 113, and driven from the cam shaft 115. Rotatable movement of the cam shaft 115 will thus move the cage 191 back and forth along the slides 202, 202 in predetermined timed relation with respect to travel of the counting conveyor 10 to vary the speed of travel of the transfer conveyor and provide a dwell in the travel of the transfer conveyor as the rows of cookies or sandwiches are in vertical alignment above their respective drop chutes 15, 15 to accommodate the dropping of the rows of cookies through said drop chutes upon release of the drop gates 17, 17, by sidewise movement thereof.

Figure 11:
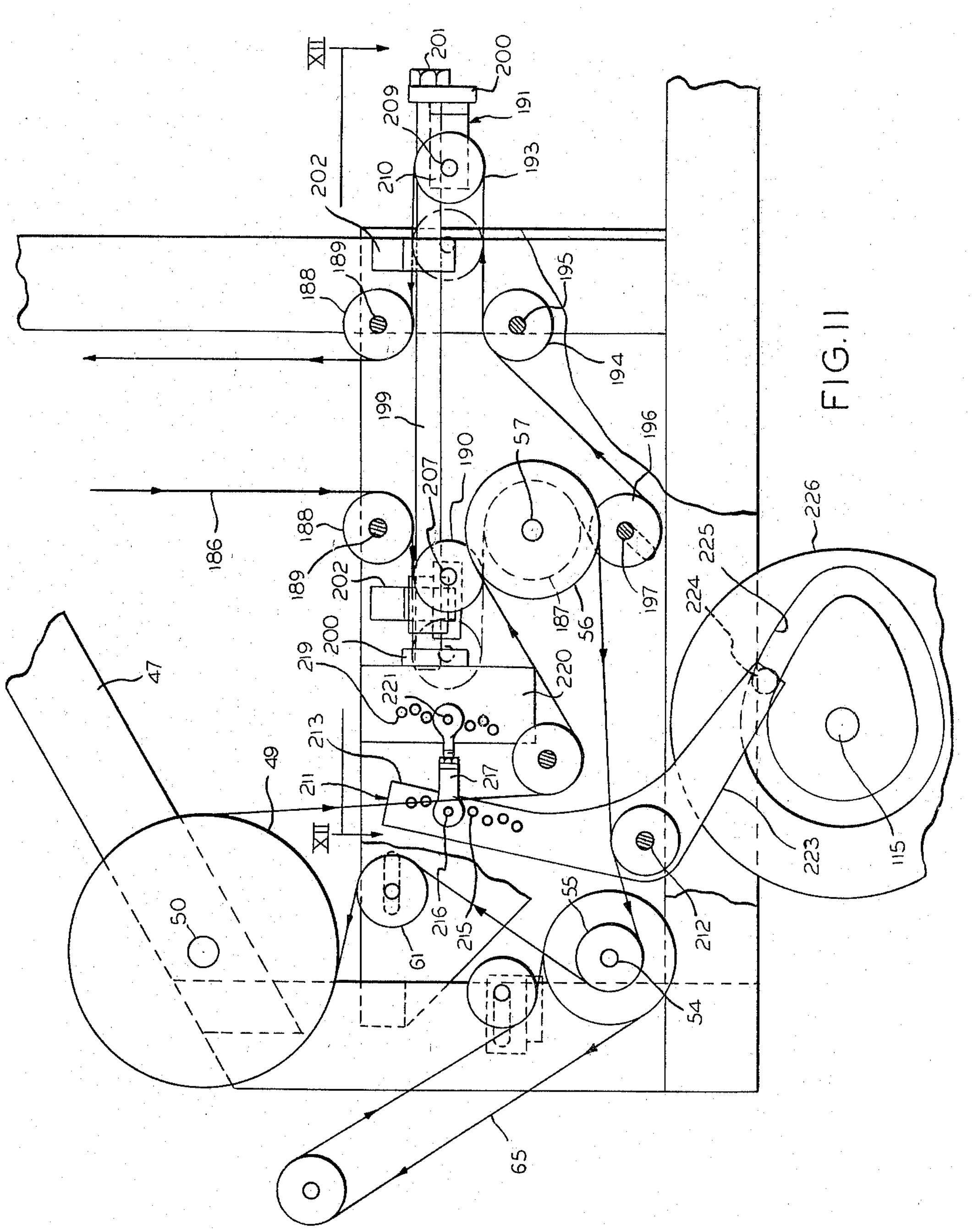
FIGURE 11 is a fragmentary side elevational view showing the intermittent drive to the transfer conveyor.
Figure 12:
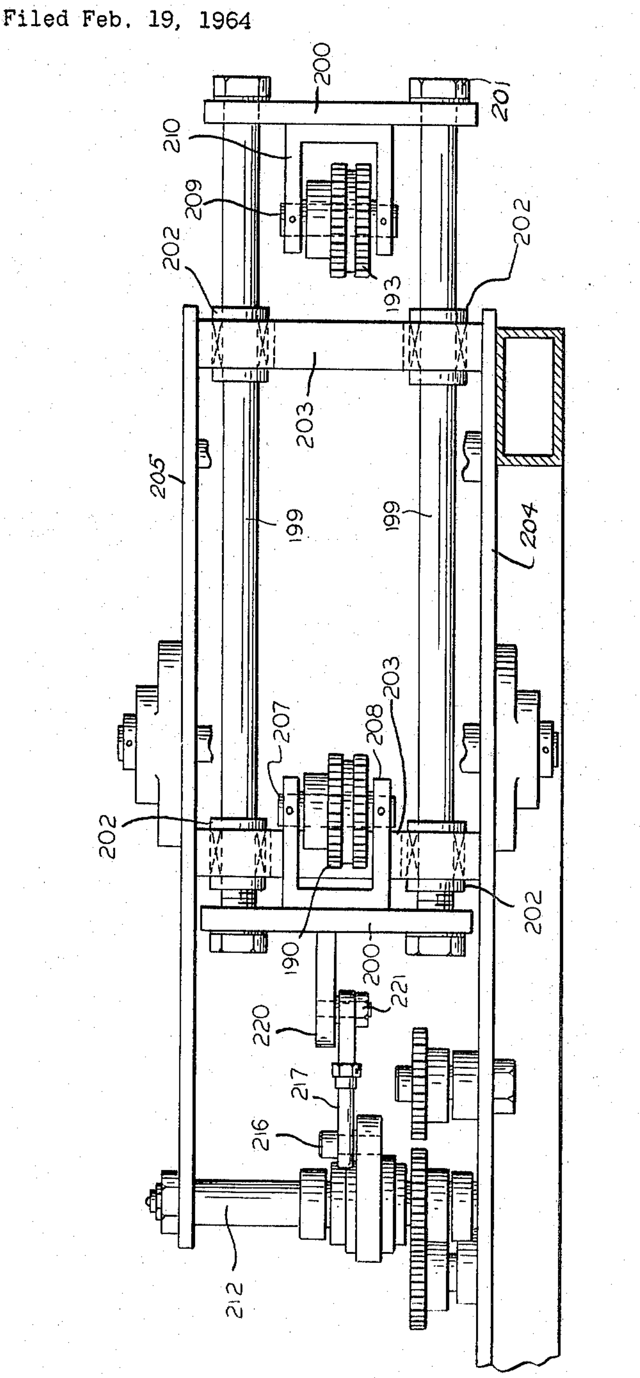
FIGURE 12 is a horizontal sectional view taken substantially along lines XII—XII of FIGURE 11 and showing the carriage placing a dwell in the drive to the transfer conveyor, in plan.

The holes 215 of the lever arm 213 of the bellcrank 211 and the balls 219 in the tongue 220 are at the same angular relation with respect to each other. The horizontal distance between associated holes will always be the same. The groups of holes 215 and 219 are thus so spaced along said lever arm and tongue as to provide the required dwells in the transfer conveyor 13 for various groups or counts of cookies or sandwiches. For example, the top hole 215 and the corresponding hole 219 in the tongue 220 will provide dwells for the discharge of a sandwich count of 21, that is, 21 sandwiches to a row. The count for the downwardly spaced holes successively decreases and the bottom hole 215 provides a dwell in the travel of a transfer conveyor for a sandwich count of 10 or 5 it being understood that with the present apparatus for a count of 5, two spaced aligned rows of cookies with five cookies or sandwiches in each row are dropped into adjacent trays upon sidewise movement of the associated drop gate 17, and that for a cookie count of 10, only one row of cookies or sandwiches containing 10 sandwiches, is supported on each drop gate and dropped by sidewise movement of the drop gate. The pins 216 and 221 are shown in FIGURE 11 as being mounted in their respective holes 215 and 219 to provide a dwell in travel of the transfer conveyor 13 for sandwich counts of 7 or 14, that is two spaced aligned rows of sandwiches with 7 sandwiches in each row are dropped from each drop gate 17 when positioned directly above the associated drop chutes 15.

*Drop chutes*

Referring now in particular to the drop chutes 15, it should be understood that where two spaced groups of cookies are conveyed along each drop gate 17 by the transfer conveyor 13, a drop chute 15 is provided for a first group of cookies or sandwiches on the material carrying surface of each drop gate 17, and a second drop chute 15 is provided for the second group of sandwiches on each drop gate rail 17. Two rows of sandwiches are thus guided to drop into each of two side by side trays on the tray conveyor 18. In the present machine, two drop chutes are provided for sandwich counts up to 9 in each group. For sandwich counts over 9 up to 21, one drop chute is provided to guide two rows of sandwiches into a tray 16 disposed beneath the drop chute. The chutes 15 are interchangeable and separate drop chutes of the required size are provided for the various sandwich counts to be loaded.

For the sandwich count loaded by the particular apparatus herein shown and described, two drop chutes 15 are adjustably mounted on parallel spaced bars 227 spaced above and extending transversely of the transfer conveyor 18. The bars 227 are mounted at their opposite ends on blocks 229. The blocks 229, 229 are slidably mounted on parallel spaced rods 230, 230 extending horizontally and along opposite sides of the transfer conveyor. The rods 230 are mounted at their forward ends on blocks 231 secured to the insides of the upright frame members 132, forming a part of the frame structure 125 supporting the transfer and tray loading conveyors. The rods 230, 230 are held in position by hand clamping screws 235 threaded in rear support blocks 236 for the rods 230, 230 and supported on the outside of rear upright frame members 132, 132.

Figure 8:
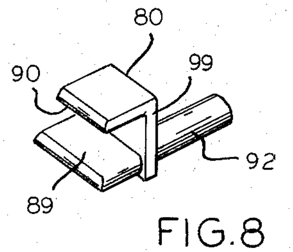
FIGURE 8 is a perspective view of switching device for the counting conveyor.

The supports for the drop chutes on the bars 227, comprise support strips 237 extending longitudinally of the tray conveyor and supporting flanges 238 extending outwardly of side walls 244 of the drop chute. The top surfaces of the flanges 238 are engaged by bars clamped into abutting engagement with the undersides of the bars 227, 227 by hand operated clamping screws 240, 240. As shown in FIGURE 8, the clamping screws are threaded in lugs 242 on the upper ends of blocks 243 projecting upwardly of the transverse frame members 239, adjacent opposite ends thereof. The clamping screws 240 extend perpendicular to the beveled surfaces 241 on the bars 227, to position the clamping ends of the clamping screws 240 parallel to said beveled surfaces to clampingly engage the inclined surfaces 241 and hold the associated drop chutes 15 in position, to receive cookies or sandwiches dropped upon release movement of the drop gates 17, 17.

Figure 18:
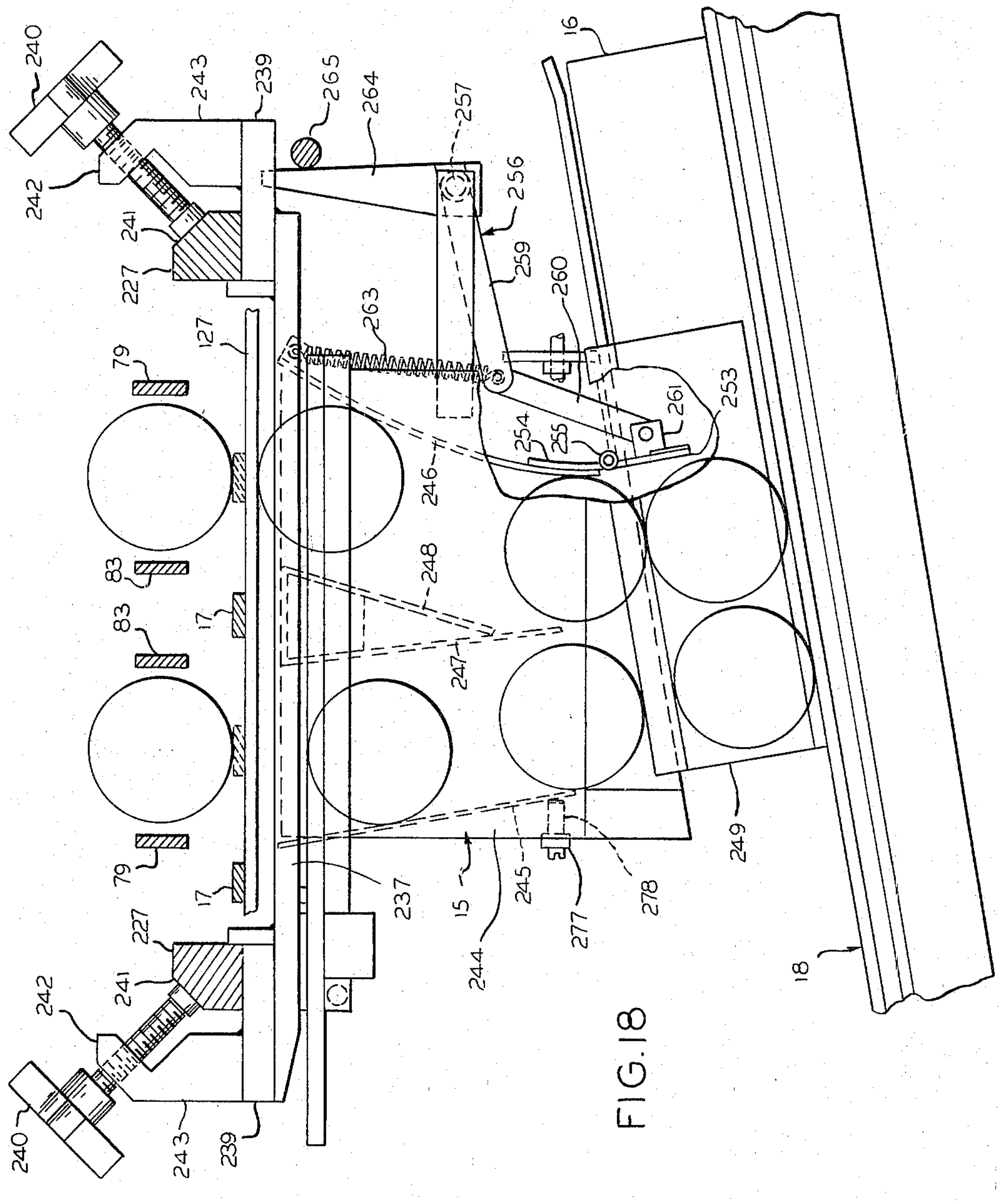
FIGURE 18 is an enlarged fragmentary sectional view, showing the support for the drop chute and showing the drop chute positioned in cookie receiving relation with respect to the drop gate.
Figures 18A, 19:
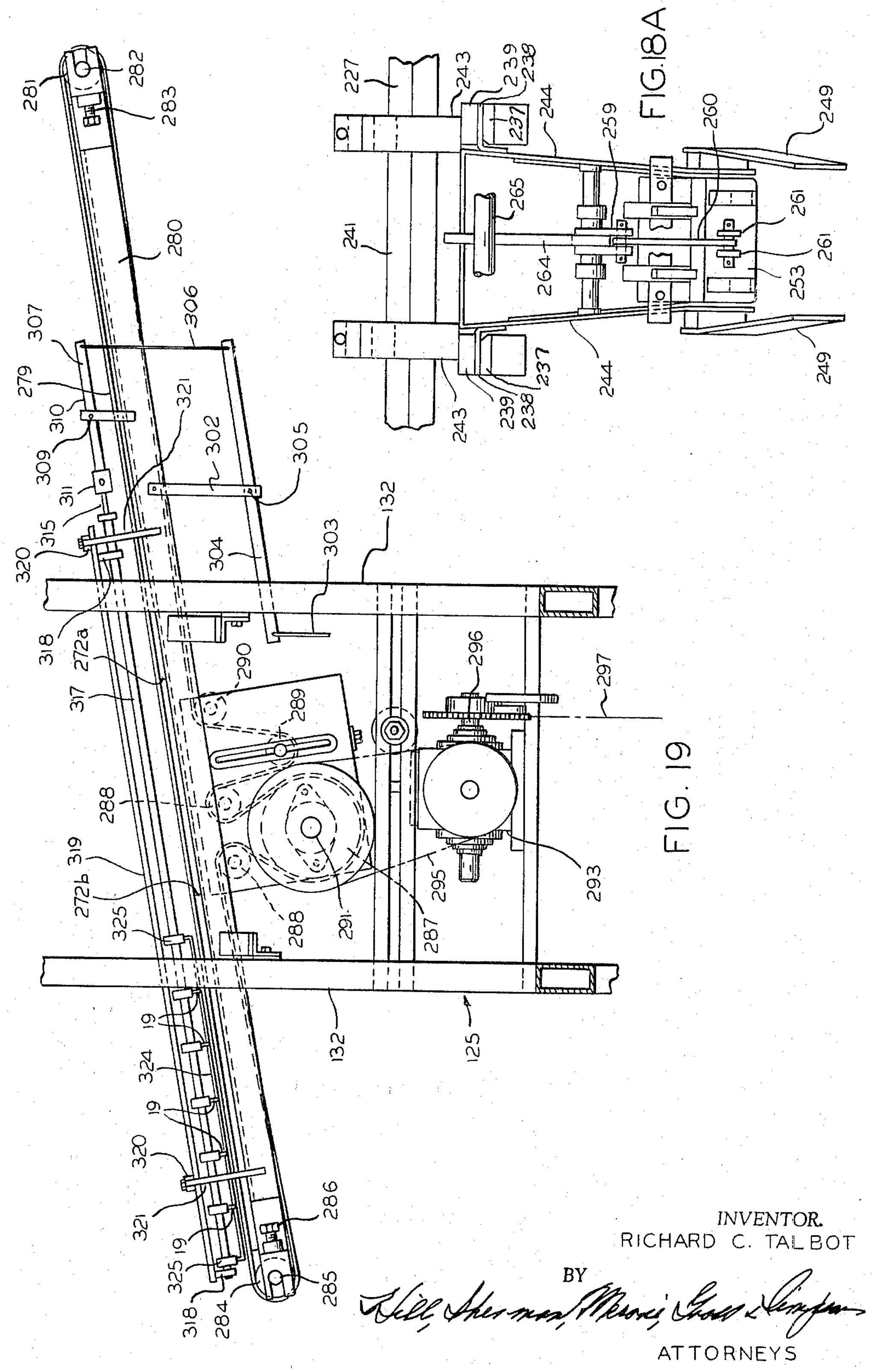
FIGURE 18A is a fragmentary view of the drop chute looking towards the rear end of the chute.
FIGURE 19 is a sectional view taken transversely of the support frame for transfer conveyor and showing the drive to the transfer conveyor and the linkage and leverage connection for moving the tray stops or positioners out of the path of travel of the trays or cartons.

Each drop chute 15 has opposite side walls 244 inclined inwardly from the upper to the lower ends thereof to form a hopper-like chute converging toward its discharge end. An inclined front wall 245 extends between the side walls 244, 244. An arcuate rear wall 246 curving inwardly from the upper to lower end thereof toward the forward end portion of the chute extends between the rear end portions of the side walls 244, 244. An intermediate divider is provided in the drop chute, which is shown in FIGURE 18 as having an inclined front wall 247 generally parallel to the wall 245 and spaced therefrom a distance slightly greater than the diameter of a sandwich and as having an inclined back wall 248 generally parallel to the wall 246 and spaced forwardly of said wall a distance slightly greater than the diameter of a sandwich or cookie. The spaces between the side walls 244, 244 and the front wall 245 and rear wall 247 of the intermediate divider and the front wall 248 of the intermediate divider and the rear wall 246, thus provided converging chutes in registry with the lines of travel of the sandwiches along the drop gates 17 to guide the sandwiches for discharge into the trays 16 in two adjacent rows for each dumping operation, as shown in FIGURE 18. The side walls 244, 244 each have a guide plate 249 secured thereto and depending therefrom to a position closely adjacent the tray conveyor 18, for retaining the trays 16 from lateral movement as they pass into sandwich receiving relation with respect to the respective drop chute 15. The guide plates 249 are shown in FIGURE 18*a* as being spaced outwardly from the side walls 244, 244 and diverge inwardly to the margins of said side walls as they extend rearwardly and cooperate with the horizontal legs of guide angles 349 to guide misaligned trays to pass between the side guides 249.

The rear wall 246 of the drop chute 15 has a hinged guide 253, forming a downward continuation thereof and movable into an associated tray during the dumping operation, to guide the second or rear row of sandwiches to pass into the tray in aligned relation with respect to and adjacent the front row of sandwiches.

The hinged guide 253 interleaves and is pivotally connected to a hinge plate 254 by a hinge pin 255. The hinge plate 254 generally conforms to the contour of the rear wall 246 and is suitably secured to the outside thereof, to position the guide 253 to depend from the bottom of said rear wall 246 in generally parallel relation with respect thereto.

The guide 253 is moved downwardly into a tray 16 during a dumping operation and is withdrawn from said tray after each dumping operation by means of a bellcrank 256 pivoted intermediate its ends to a bracket extending rearwardly of the drop chute 15, by a pivot pin 257. The crank 256 has a lever arm 259 extending inwardly therefrom having a link 260, pivotally connected to its free end and depending therefrom. The opposite end of the link 260 is pivotally connected to an ear 261 secured to the guide 253 and extending rearwardly therefrom. A tension spring 263 is connected between the upper end portion of the rear wall 246 and the lever arm 259, adjacent the free end thereof, to bias the lever arm 259 in an upwardly extended position and to thereby bias the hinged guide 253 into a rearwardly extended position above the associated tray 16. The crank 256 has an upright lever arm 264 engaged by a transversely extending rod 265 operated by the mechanism for withdrawing the drop gates 17, 17 from the paths of sandwich travel, to accommodate the rows of sandwiches to drop through a registering drop chute into a tray or carton disposed therebeneath. The rod 265 extends transversely of the tray conveyor and is mounted at one end in a lever arm 266, intermediate the ends of said lever arm. The lever arm 266 in turn is mounted on a transverse pivot pin 267, mounted in a bearing bracket 269, secured to and extending inwardly of an upright frame member 132 of the frame structure 125. The rod or pivot pin 267 is shown in FIGURE 18 as extending across the frame structure 125 and as having a lever arm 270 secured to its opposite end portion and forming a support for the opposite end of the rod 265 from the lever arm 266. The opposite end of the shaft 267 from the bearing support 269 is mounted in the bearing support 270, mounted in the opposite upright 132 from the upright forming a support for the bearing support 269. The lever arm 266 extends above the rod 265 and has a slot 273 formed in its upper end portion, engaged by a pin 274 extending from the lower end of a lever arm 275. The lever arm 275 is secured to the shaft 133 and is rocked by said shaft upon rocking movement of the crank arm 139 rocked by the cam 137 on the cam shaft 115.

The pivoted guide 253 is thus pivoted downwardly during each sandwich dropping operation and is driven by the mechanism that moves the drop gates 17, 17 out of supporting positions, and forms a guide for the rear row of sandwiches during the operation of loading two aligned cartons or trays, and comes in behind the last carton when loading the last two rows of cookies on the last carton. This guide thus assures that the rows of sandwiches will be in aligned relation with respect to each other during the loading operation and prevents the sandwiches from falling on their sides as loaded into the respective trays.

A bar 277 extends between the side walls 244 and is suitably secured thereto at its ends and has spaced screws 278 threaded therein abutting the bottom portion of the end wall 246 to flex said end wall toward the wall 247 to vary the spacing between said walls at the discharge end thereof when desired.

*Tray conveyor*

The tray conveyor 18 is shown in FIGURE 19 as being a canvas belt type of conveyor including a belt 279 having a material carrying run movable downwardly along the top surface of an inverted generally U-shaped pan 272. The belt is supported on the pan 272 on parallel spaced rails **272*a* extending along said pan to the incoming side of the drop chutes 15 and on downwardly spaced rails 272*b* extending from the outgoing side of the drop chutes 15 to the discharge end of the conveyor. The legs of the pan 272 form side frame members 280 for the conveyor and are suitably mounted on the uprights 132, 132 of the frame structure 125. The belt 279 changes its direction of travel at the upper end portions of the side frame members 280, about an idler roller 281 mounted on a transverse shaft 282. A conventional form of screw type take up 283 is provided on each side frame member 280 to take up tension on the belt when required. The belt 279 changes its direction at the lower end of its travel about an idler roller 284 on a transverse shaft 285. A take up 286, similar to the take up 283, is shown as being provided on each side frame member 280 to maintain the belt at the proper tension. The belt 279 is wrapped intermediate its ends about a drive roll 287 by wrapping idlers 288, 288, suitably mounted at opposite sides of the axis of rotation of the drive roller 287 and spaced thereabove. The belt 279 is then trained about a tension idler 289, for maintaining tension on the drive roller 287 in a conventional manner. From the tension idler 289, the belt is trained about an idler 290 along the frame members 280 to and about the direction changing idler 281**.

The belt, therefore, is unsupported under the drop chutes to provide a cushioning effect as the cookies are dropped onto their trays, and to thereby avoid damage to the cookies when dropped.

The drive roller 287 is suitably mounted on a transverse shaft 291 driven from a right angle drive 293 of a conventional form, through a chain and sprocket drive 295. The right angle drive 293 may be worm and worm gear type of drive and includes a drive shaft 296 driven from the cam shaft 115, through a chain and sprocket drive 297.

*Tray positioners*

The tray stops or positioners 19, 19 determine the positions of the trays as conveyed beneath the drop chutes 15, 15 by the tray conveyor 18, and serve to stop the first tray of two abutting longitudinally aligned trays for each drop chute 15, and to position this tray to be first loaded with two rows of cookies and to then accommodate advance of this tray to be loaded with two more rows of cookies. The tray stops will then stop the first tray and the next succeeding tray, to accommodate the loading of the rear end portion of the first tray with one row of cookies and the leading end portion of the next succeeding tray with one row of cookies, and will successively stop the two trays until the next succeeding tray has been completely loaded.

As the third trays are conveyed towards the drop chutes 15, 15 and during the loading of the first two abutting trays for each row of trays, the delay or retaining fingers 20, 20 will engage the ends of the third trays of each row of trays and will hold the trays to place gaps between the third trays and the next preceding trays to position the third trays in proper position for a next succeeding loading operation, in the manner just described.

The tray stops or positioners 19, 19 and the tray retainers or delay fingers 20, 20 are all driven from a cam 298 on the cam shaft 115. The cam 298 engages a follower roller 299 on a lever arm 300, journalled on the rock shaft 144 forming a rockable support for the lever arm 146, operating the drop gates 17 and the drop chute guide 253. The lever arm 300 is mounted intermediate its ends on the rock shaft 144 and has an arm 301 extending from said rock shaft, having the lower end of a link 303 pivotally connected thereto. The link 303 extends upwardly of the arm 301 and is pivotally connected at its upper end to a lever arm 304 pivoted intermediate its ends on a pivot pin 305, mounted on the lower end portion of a bracket 302, depending from a side frame member 280 for the conveyor 18. The free or rear end of the lever arm 304 has a link 306 transversely pivoted thereto and extending upwardly therefrom. The upper end of the link 306 is transversely pivoted to the free end of a lever arm 307 on a transverse rock shaft 309. The rock shaft 309 forms an operator for the tray stops or positioners 19, 19 and also forms an operator for the tray retainers 20, 20.

The rock shaft 309 has rocking arms 310 at opposite end portions thereof, and rocked thereby upon rocking movement of said shaft. The rocking arms 310, 310 have a slotted drive member 311, pivotally connected therebetween and having a slot 312 extending for substantially the length thereof. The slot 312 is engaged by rollers 313 on crank arms 315. Each crank arm 315 extends from a collar 316 mounted on the rear end of a shaft 317 for rocking said shaft. The slot 312 accommodates the adjustment of the stops 19, 19 on opposite sides of the conveyor towards and from each other in accordance with the size of tray or carton to be loaded. The shafts 317 extend along each side of the conveyor and each shaft 317 has a plurality of stop or positioner fingers 19, 19 freely mounted thereon and retained in position by spaced collars 323, 323. The construction and drive to the stop or positioner fingers 19, 19 is the same for each side of the conveyor, so one side only need herein be described.

Figures 20, 21:
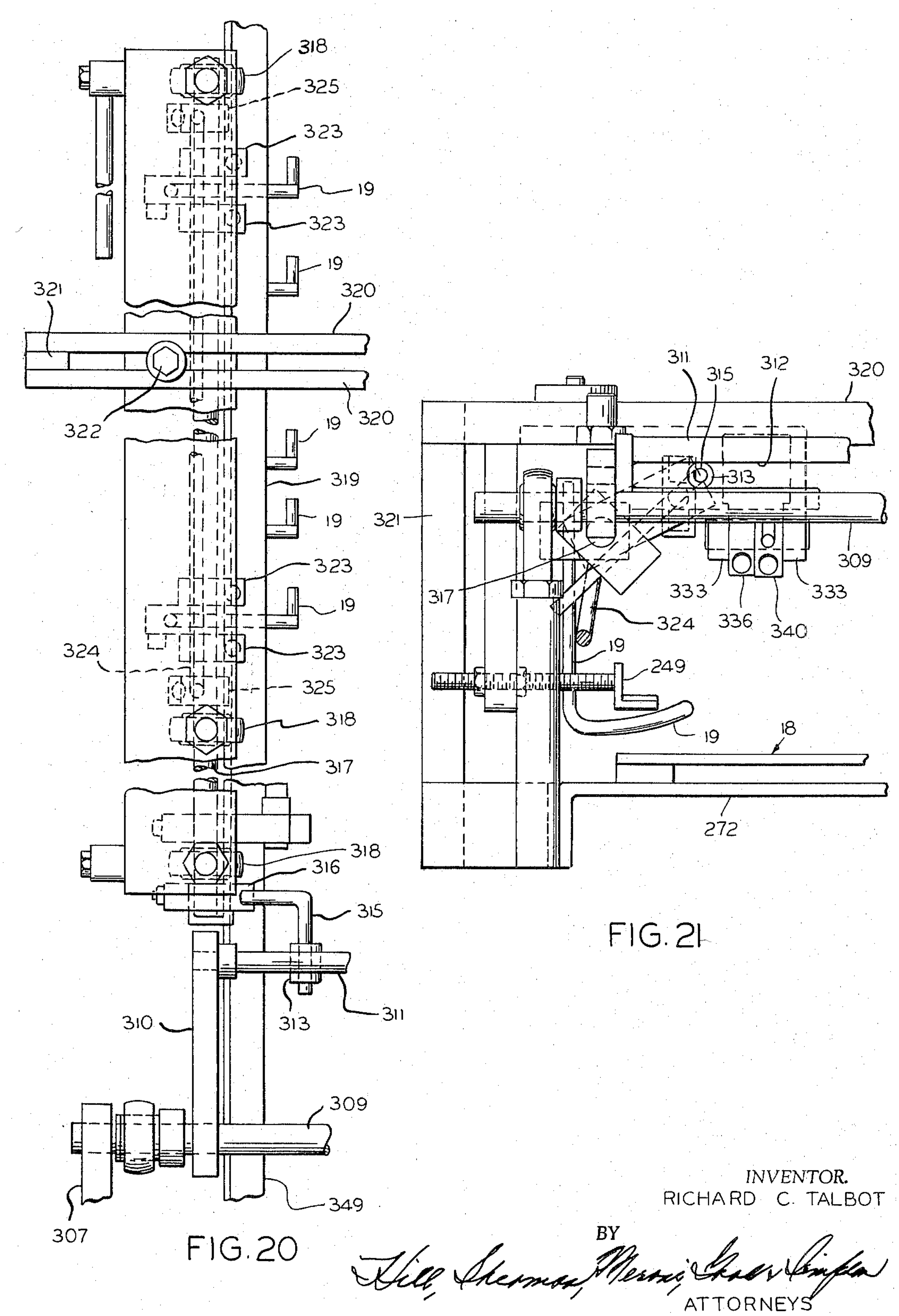
FIGURE 20 is an enlarged detail fragmentary plan view showing certain details of the actuating mechanism for the tray stops and tray retainers.
FIGURE 21 is an enlarged detail fragmentary sectional view taken transversely of the tray conveyor in order to show certain details of the operating mechanism for the tray stops.

The shaft 317 is disposed above and extends along one side of the tray conveyor 18 and is mounted for adjustable movement toward and from the center of said conveyor to properly position the stop or positioner fingers 19, 19 to control the travel of trays along the tray conveyor 18. As shown in FIGURE 20, the shaft 317 is journaled in spaced bearing supports 318, supported on and depending from the horizontal leg of an angle 319. The angle 319 is supported between spaced bars 320, extending transversely of the conveyor 18 and suitably supported at their opposite ends on the side frame members 280 of the conveyor in vertically spaced relation with respect thereto on upright legs 321 spacing said bars apart. The legs 321 are spaced from and supported on an associated side frame member 280. The bars 320 are spaced along the conveyor and have bolts 322 extending therethrough the horizontal legs of the angles 319, for bolting said angles in position.

A positioner or stop finger 19 is freely mounted on the shaft 317, between each pair of spacer collars 323. The stop fingers 19 depend from the shaft 317 and are biased by gravity into the path of travel of a carton along the tray conveyor 18. A generally U-shaped rod or operator 324 extends along the insides of the stop fingers 19 and is secured at the ends of its legs to collars 325 secured to the shaft 317 on the outer sides of the stop fingers 19. Rocking movement of the shaft 317 is timed by operation of the cam 298, to rock the shaft 317 and the U-shaped operating bar 324, to engage the insides of the stop or positioner fingers 19 and momentarily withdraw said fingers from the path of travel of the associated tray or carton, to accommodate the tray to advance a distance equal to two rows of sandwiches for a next succeeding loading operation. The tray stops 19 are also so positioned along the shaft 217, that the distance between the stops or positioners will be substantially equal to twice the diameter of a sandwich or the space taken up by two rows of sandwiches in a tray or carton.

During the loading of a tray, the tray is first stopped against an uppermost stop finger 19. As two rows of sandwiches are dropped into the tray, the operator 324 will withdraw all of the fingers from the path of travel of the tray for a time sufficient to accommodate the tray to pass by the stop finger holding it into a loading position. The operator 324 will then be rocked upwardly, and the next downwardly spaced finger 19 will engage the end of a tray, and stop the tray in position to be loaded with two more rows of cookies, next adjacent the two rows of cookies previously loaded. This stopping operation will then be continued until two trays have been completely loaded, at which time the advance tray is beyond the forwardmost stop finger 19, and will retain the fingers in retracted positions until the two trays have been conveyed past the fingers for further treatment. As soon as the succeeding tray passes by the first finger 20, this finger moves into position to engage the leading end of the third tray and stop this tray in position to be loaded, first with two rows of sandwiches.

*Tray delay*

A tray delay or retainer finger 20 is provided for each row of trays. The tray delay fingers 20 are moved into and out of position to engage a tray by pivotal movement of the shaft 317 in timed relation with respect to withdrawal of the stop fingers 19, 19.

Figures 22, 23:
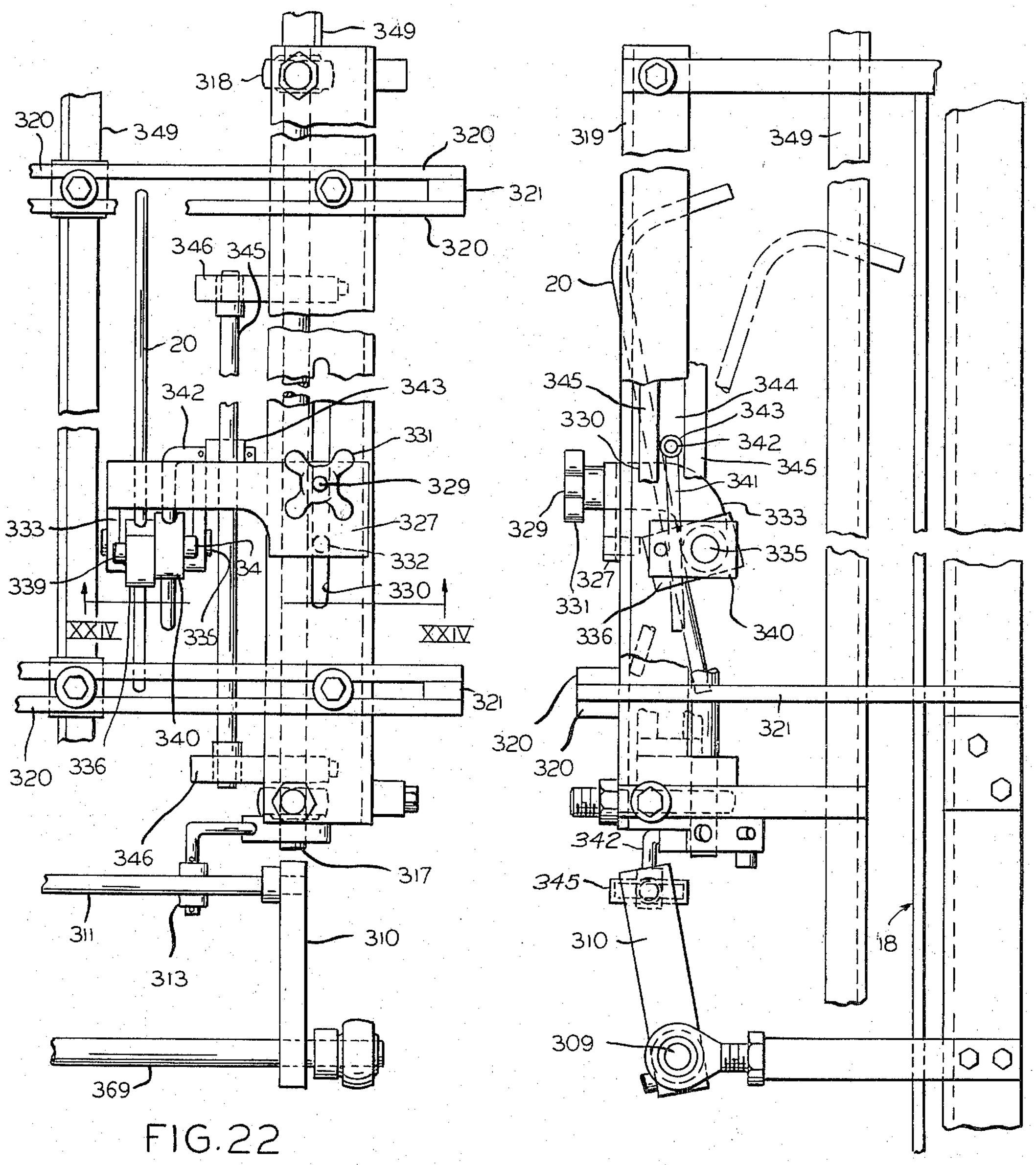
FIGURE 22 is an enlarged fragmentary plan view looking on top of the tray conveyor at the opposite side of the conveyor from FIGURE 20, and showing certain details of the operating mechanism for the tray retainers.
FIGURE 23 is a fragmentary side elevational view showing certain other details of the mechanism for operating the tray retainers than are shown in FIGURE 22.
Figure 24:
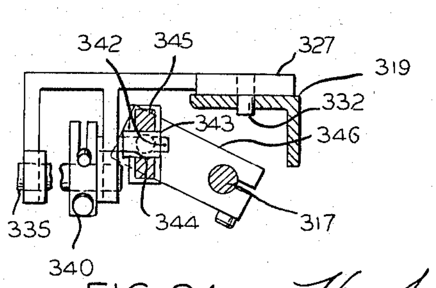
FIGURE 24 is a fragmentary detail sectional view taken substantially along line along line XXIV—XXIV of FIGURE 22.

As shown in FIGURE 22, the retainer or delay fingers 20 are each transversely pivoted to a separate bracket 327. Each bracket 327 is mounted on the horizontal leg of an angle 319. The bracket 327 extends inwardly of the angle 319 and is retained in position by a clamping screw 329, which accommodates adjustment of the bracket along the angle. The clamping screw 329 extends through a slot 330 extending along the portion of the angle 319 extending rearwardly of the incoming side of the associated drop chute 15. The head of the clamping screw 329 abuts the underside of the horizontal leg of the angle 319 and is clamped thereto by a hand grip 331, threaded on the upper end portion of said clamping screw and cooperating with the clamping screw to guide the bracket against angular movement with respect to the horizontal leg of the angle 319.

It should here be understood that when loading two rows of trays 16, a bracket 327 is supported on the horizontal leg of each angle 319 to support its retarding or delay finger 20 inwardly of said angle, in position to engage the inside of the rear wall of a tray or carton, and space the carton from the next succeeding advance carton.

The bracket 327 has spaced ears 333 depending from its inner end portion over the path of travel of the tray along the conveyor 18 and forming a mounting for a transverse rock shaft 335. The shaft 335 has a clamping block 336 mounted thereon. A retarding finger 20 extends through said clamping block and is suitably clamped thereto. The clamping block 336 is also suitably clamped to the rock shaft 335 to be rocked thereby. A second clamping block 340 is clamped to the shaft 335 adjacent the clamping block 336 between the ears 333, 333 and has a crank pin 341 extending therethrough generally parallel to the finger 40. The crank 341 extends forwardly of the clamping block 340 and has a right angle turned end portion 342 having a roller 343 rotatably mounted thereon. The roller 343 fits within the slot 344 in a drive member 345. The drive member 345 is mounted at its opposite ends on spaced crank arms 346 clamped or otherwise secured to the shaft 317 and rockably driven by said shaft. The drive member 345 is so timed with retractible movement of the stops 19 as to move an associated delay finger 20 into a tray 16 traveling downwardly along the conveyor 18 as the stop fingers 19, 19 are retracted to release a loaded or partially loaded tray to travel downwardly along said conveyor, step by step. As the advance trays are stopped for a loading operation, the retarding finger 20 will move out of the unloaded rear tray of any two trays being loaded, and will move downwardly to engage the rear wall of the third tray as the trailing end portion of the last tray of the two trays is loaded and the positioning fingers 19, 19 are retracted. This will place a gap between the second and third trays.

It should here be understood that the number of stop fingers 19 depends upon the number of rows of cookies to be loaded in a tray. As for example, only one set of stop fingers need be provided for loading single row trays, while three sets of stop fingers are provided for loading three rows trays, and as in the present instance five sets of stop fingers are provided for loading five row trays.

The clamping screws 329 and slots 330 in the horizontal legs of the angles 319 accommodate adjustment of the delay fingers 20 along the tray conveyor 18 in accordance with the length of the trays or cartons to be loaded. The slotted drive members 345 rocking the delay fingers 20 through the cranks engaging within the slots of said drive members will thus rockably move the delay fingers 20 in various positions of adjustment along the horizontal legs of the angles 319. The spaced support bars 320, 320 supporting the angles 319 for adjustable movement toward and from the center of the conveyor to properly locate the stop fingers 19 for the width of trays to be loaded, also properly locate the delay fingers 20 with respect to the centers of the trays to be loaded.

A separate holddown bar 347 for each row of trays 16 is suitably suspended from the rear support bars 320 and extends along the tray conveyor 18 to a position adjacent the incoming end of the associated drop chute 15. The holddowns 347 are spaced above and extend along the center of travel of the trays inside of the delay fingers 20, 20 to retain the trays to the conveyor 18, as they pass to the drop chute 15.

Figure 25:
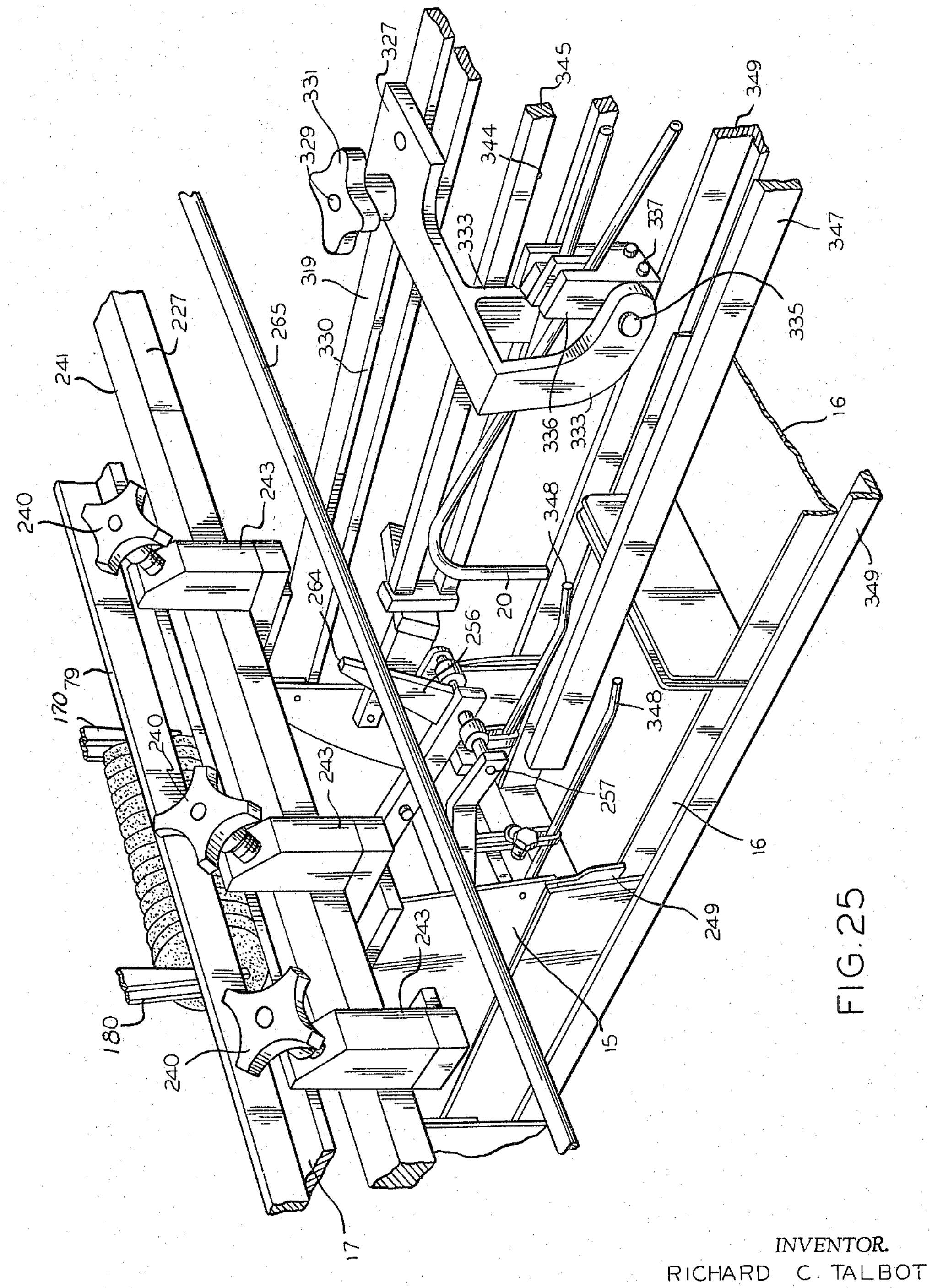
FIGURE 25 is a perspective view of a part of the tray conveyor showing a tray retainer mounted thereon.
Figure 26:
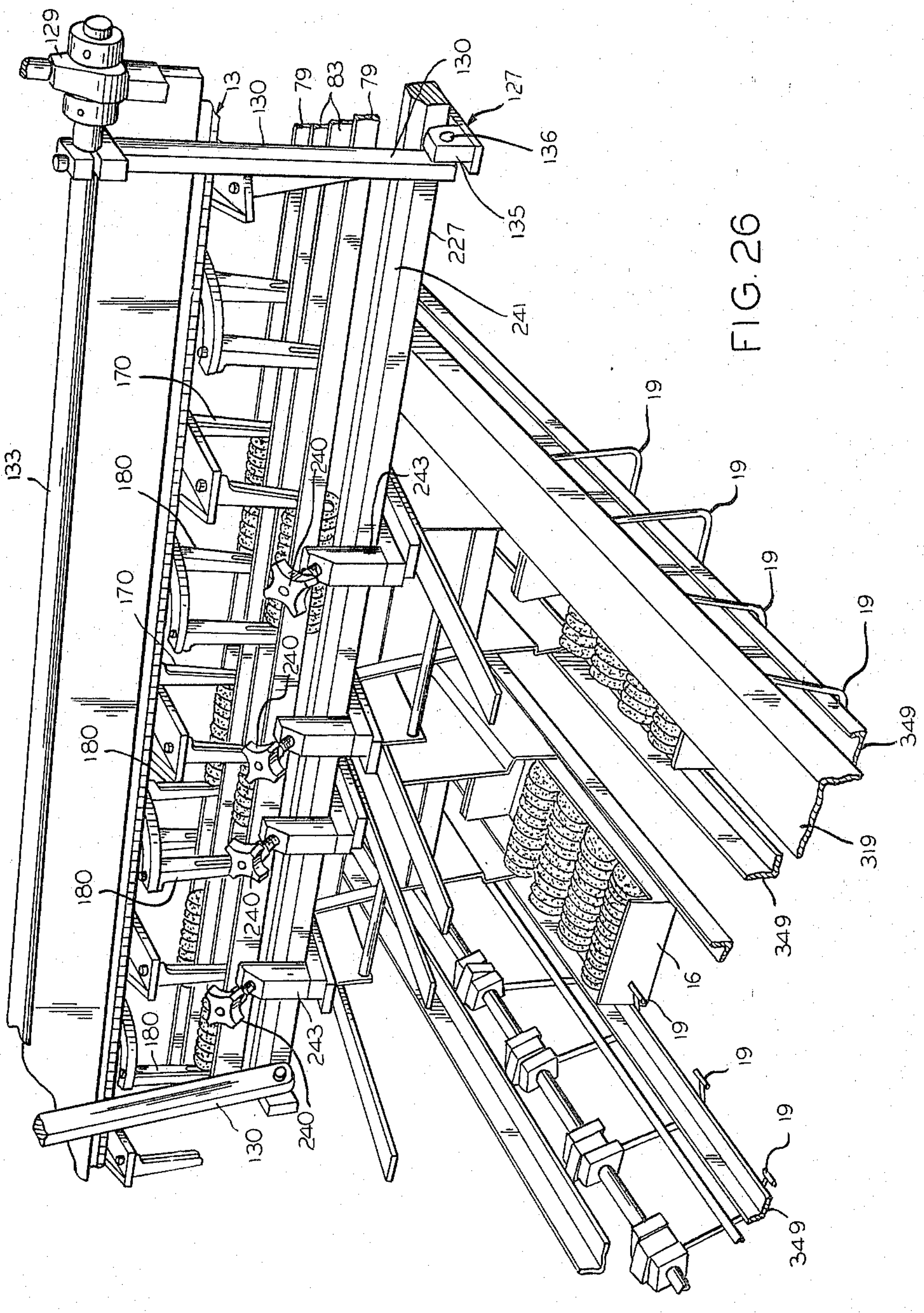
FIGURE 26 is a fragmentary perspective view looking at the discharge portion of the tray conveyor.

Hold down fingers 348 extend rearwardly of each drop chute 15 on opposite sides of the hold down bars 347 and have upwardly turned free end portions to retain the trays to pass under the drop chutes 15 as they leave the hold down bars 347 (FIGURE 25).

Side guides 349, 349 are also supported on and depend from the spaced support bars 321 and extend along the outer sides of the guide plates 249, 249 of the drop chutes 15, 15, to maintain the trays in alignment with the drop chutes as they pass to and from said drop chutes.

The side guides 349, 349 are shown in FIGURES 20, 21, and 22 as being in the form of angle irons, the horizontal legs of which form guides for the trays. The horizontal legs of the angle irons are partly cut away in the region of the guide plates 249, 249 of the drop chutes 15 to accommodate the inner sides of said guide plates to form continuations of the ends of the horizontal legs of said side guides. The side guides 349, 349 are suspended from the support bars 320, 320 in a suitable manner and are spaced above the conveying surface of the conveyor to accommodate the stop fingers 19, 19 to pass thereunder and to accommodate adjustment of the side guides in accordance with the size and positioning of cartons to be loaded while passing along the transfer conveyor 18.

While the description of the particular apparatus herein shown is directed to the counting and loading of cookies and sandwiches, it should be understood that the apparatus is not limited to the counting and loading of cookies and sandwiches, but may be used to count and load articles of various types and shapes, such as, detergent cakes, poker chips and various other articles.

Moreover, while only one form in which the invention may be embodied is herein shown and described it may readily be understood that various variations and modifications in the invention may be attained without departing from the spirit and scope of the novel concepts thereof.

I claim as my invention:

1. In an apparatus for loading cookies and the like, a counting conveyor, conveying counting and separating cookies into spaced aligned groups, a tray conveyor extending transversely of said counting conveyor and conveying empty trays for loading and full trays for further processing, a transfer conveyor forming a continuation of said counting conveyor, at least one drop chute mounted in cookie receiving relation with respect to said transfer conveyor and in cookie discharge relation with respect to trays traveling along said tray conveyor, and a drop gate forming a material carrying surface of said transfer conveyor and extending over said drop chute and movable laterally to accommodate groups of cookies to drop through said drop chute for loading.

2. In an apparatus for loading cookies and the like, a counting conveyor, conveying counting and separating cookies into spaced aligned groups, a tray conveyor extending transversely of said counting conveyor, said tray conveyor conveying empty trays and the like for loading and conveying full trays for further processing, a transfer conveyor forming a continuation of said counting conveyor and extending over said tray conveyor, at least one drop chute in cookie receiving relation with respect to said transfer conveyor and in cookie discharge relation with respect to said tray conveyor, a drop gate forming the material carrying surface of said transfer conveyor and extending over said drop chute, and means for moving said drop gate laterally with respect to said transfer conveyor to effect dropping of the cookies through said drop chute for loading.

3. In an apparatus for loading cookies and the like, a counting conveyor conveying, counting and separating cookies into spaced aligned groups, a tray conveyor extending transversely of said counting conveyor and conveying empty trays for loading and full trays for further processing, a transfer conveyor forming a continuation of said counting conveyor and extending over said tray conveyor, at least one drop chute in cookie receiving relation with respect to said transfer conveyor, a drop gate forming the material carrying surface of said tray conveyor and extending over said drop chute, guide plates extending along opposite sides of said drop gate, means for driving said transfer conveyor, other means operatively connected with said drive means and providing a dwell in the operation of said transfer conveyor, other means driving said means for providing a dwell in the operation of said transfer conveyor, and means driven by the driving means for providing a dwell in the operation of said transfer conveyor for moving said drop gate laterally with respect to said guide plates to effect the dropping of a row of cookies through said drop chute into a tray on said transfer conveyor during a dwell in the operation of said transfer conveyor.

4. In an apparatus for loading cookies and the like, a counting conveyor conveying, counting and separating cookies into spaced aligned groups, a tray conveyor extending transversely of said counting conveyor and conveying empty trays for loading and full trays for further processing, a transfer conveyor forming a continuation of said counting conveyor and extending over said tray conveyor, at least one drop chute in cookie receiving relation with respect to said transfer conveyor and in cookie discharge relation with respect to said tray conveyor, a drop gate forming a material carrying surface of said transfer conveyor, guides extending along opposite sides of said drop gate, common drive means for said counting conveyor and said transfer conveyor, intermittent drive means placing a dwell in the travel of said transfer conveyor, means operating said intermittent drive means to provide a dwell in the travel of said transfer conveyor, and other means driven by said operating means for said intermittent drive means, and driven in timed relation with respect to said intermittent driven means, for moving said drop gate laterally during a dwell in the operation of said transfer conveyor as the cookies conveyed along said drop gate are in vertical alignment with said drop chute.

5. In an apparatus for loading cookies into trays and the like, a counting conveyor, conveying, counting and separating cookies into spaced aligned groups, a tray conveyor extending transversely of said counting conveyor and conveying empty trays for loading and full trays for further processing, a transfer conveyor forming a horizontal continuation of said counting conveyor and extending over said tray conveyor, at least one drop chute in cookie receiving relation with respect to said transfer conveyor, a drop gate forming the material carrying surface of said transfer conveyor, guide plates extending along opposite sides of said drop gate, a drive member for driving said counting conveyor, a sprocket, an endless chain driven from said sprocket and forming a drive member for said transfer conveyor, a drive connection from said drive member to said sprocket, means between said sprocket and transfer conveyor and meshing with said endless chain for varying the speed of travel of said endless chain and providing a dwell in the travel of said transfer conveyor, means for driving said last mentioned means, and means driven by the means driving said last mentioned means for moving said drop gate laterally to one side of said guide plate to effect the dropping of cookies through said drop chute upon a dwell in the travel of said transfer conveyor as the cookies conveyed thereby are in vertical alignment with said drop chute.

6. In an apparatus for loading cookies and the like, a countering conveyor, conveying, counting and separating cookies into spaced groups, a tray conveyor extending transversely of said counting conveyor, a transfer conveyor forming a horizontal continuation of said counting conveyor and extending over said tray conveyor, means for driving said counting conveyor, a drive sprocket, an endless chain driven by said drive sprocket and having a driving run having connection with said transfer conveyor and a slack run, a carriage having spaced sprockets mounted thereon, means wrapping one run of said chain partially about one of said sprockets and wrapping the other run of said chan partially about the other of said sprockets, and means moving said carriage and spaced sprockets back and forth in timed relation with respect to travel of said counting conveyor to accelerate and retard the travel of said transfer conveyor and place a dwell in the travel thereof, to accommodate the dropping of cookies from the said transfer conveyor for loading into trays on said tray conveyor.

7. In an apparatus for loading cookies and the like, a counting conveyor, conveying, counting and separating cookies into spaced aligned groups, a tray conveyor extending transversely of said counting conveyor, a transfer conveyor forming a horizontal continuation of said counting conveyor and extending over said tray conveyor, at least one drop chute in cookie receiving relation with respect to said transfer conveyor, a drop gate forming the material carrying surface of said transfer conveyor and extending over said drop chute, parallel guide plates extending along opposite sides of said drop gate, means for driving said counting conveyor, a drive sprocket, an endless chain driven by said drive sprocket and having a driving run and a slack run, a reciprocably movable carriage having spaced sprockets thereon, means wrapping said driving run partially about one of said sprockets and said slack run partially about the other of said sprockets, means moving said carriage and spaced sprockets back and forth to place a dwell in the travel of said transfer conveyor at a predetermined part of the cycle of travel thereof comprising a cam shaft, a cam on said shaft and rotatably driven thereby, a rocking arm and a linkage connection between said rocking arm and carriage, another cam on said cam shaft, and a lever and linkage connection between said drop gate for moving said drop gate laterally upon a dwell in the travel of said transfer conveyor and the positioning of the cookies conveyed thereby in registry with said drop chute.

8. In an apparatus of the class described, a horizontally traveling cookie carrying conveyor having a material carrying strip extending from the discharge end thereof, an inclined counting conveyor in material receiving relation with respect to said strip and having material carrying members movable vertically along opposite sides of said strip, and means retarding the travel of the cookies along said strip at the discharge end of said horizontal conveyor to be picked up and conveyed along their edges by said material carrying members of said counting conveyor.

9. In an apparatus of the class described, a horizontally traveling cookie carrying conveyor having a material carrying strip extending from the discharge end thereof, an inclined counting conveyor in material receiving relation with respect to said strip and having material carrying members movable vertically along opposite sides of said strip, and means retarding the travel of the cookies along said strip at the discharge end of said horizontal conveyor to be picked up and conveyed along their edges by said material carrying members of said counting conveyor, comprising at least one orbitally traveling retrading finger traveling along said strip at a slower rate of speed than the speed of travel of said horizontal conveyor and moving from a position adjacent the discharge end of said horizontal conveyor to the receiving end of said counting conveyor.

10. In an apparatus of the class described, a cookie carrying conveyor having a generally horizontal cookie carrying strip having spaced flights extending upwardly along opposite sides thereof and movable therealong and conveying cookies along said strip, supported on said strip on one side of the cookie, an inclined counting conveyor having spaced flights having spaced conveying fingers extending perpendicular thereto and moving vertically along opposite sides of said strip to pick up the cookies thereon and convey the cookies along their edges for separation into groups, said strip having a slot extending therealong from the discharge end of said cookie carrying conveyor to the receiving end of said counting conveyor beyond the region of travel of said horizontal conveyor fingers along said strip, and an orbitally traveling retarding finger extensible through said slot at the discharge end of said horizontal cookie conveyor and movable along said slot to the receiving end portion of said counting conveyor and retractible from said slot adjacent the receiving end of said counting conveyor, and traveling at a slower rate of speed than the speed of travel of said cookie carrying conveyor to thereby retard the travel of the cookies to be picked up by said counting conveyor fights and conveyed upwardly along their edges for separating and counting.

11. A counting conveyor comprising a pair of laterally spaced endless chains, drive sprockets for said chains at one end of travel thereof and idler sprockets for said chains at the opposite end of travel thereof, a material carrying strip between said chains and guide plates spaced from opposite sides of said strip and extending therealong, spaced flights pivotally connected to said chains and extending between said chains beneath said strip and having material carrying fingers extending perpendicular thereto and spaced apart distances slightly greater than the width of said strip, guide means for said flights recessing certain of said fingers beneath the material carrying surface of said strip, and other guide means for said flights extending certain other of said fingers above the material carrying surface of said strip, and means operable to periodically switch certain of said flights to said other guide means, to extend the associated fingers and effect a predetermined spacing between the fingers in material carrying relation with said strip and a separation and grouping of the material conveyed thereby.

12. A counting conveyor comprising a pair of laterally spaced endless chains, drive sprockets and longitudinally spaced idler sprockets for said chains, a material carrying strip extending between said chains and guide plates spaced from opposite sides of said strip and extending therealong, longitudinally spaced flights pivotally connected to said chains and extending beneath said material carrying strip and having conveying fingers extending perpendicularly thereto and spaced apart distances slightly greater than the width of said strip, guide means for said flights recessing certain of said fingers beneath the material carrying surface of said strip, other guide means for said flights extending certain other of said fingers above the material carrying surface of said strip, and switching means operable in timed relation with respect to operation of said conveyor and switching certain of said flights to said other guide means to support the conveying fingers thereof above the surface of said strip and to thereby effect a predetermined spacing of the material carrying fingers along said strip and a counting and separating operation of the material carried along said strip.

13. In a counting conveyor for cookies and the like, a pair of drive sprockets rotatable about a horizontal axis and a pair of longitudinally spaced idler sprockets rotatable about an axis parallel to the axis of rotation of said drive sprockets, endless chains trained about said sprockets and driven therefrom, a material carrying strip between said chains and forming the material carrying surface of said conveyor, longitudinally spaced flights pivotally connected to said chains and extending inwardly therefrom beneath and across said strip and having conveying fingers extending perpendicularly thereto and spaced apart a distance slightly greater than the width of said strip, guide means guiding said fingers to extend above the surface of said strip at the receiving end of said conveyor to convey cookies therealong, a guide track spaced in advance of said guide means and recessing certain of said fingers beneath the material carrying surface of said strip, another guide track retaining certain of said fingers above the material carrying surface of said strip, a switch forming a continuation of said guide means and guide tracks and operable to switch said flights to retain said fingers above or below the material carrying surface of said strip, to effect a separation and counting of the cookies conveyed along the surface of said strip.

14. In a counting conveyor for cookies and the like, a pair of drive sprockets rotatable about a horizontal axis and a pair of longitudinally spaced idler sprockets rotatable about an axis parallel to the axis of rotation of said drive sprockets, endless chains trained about said sprockets and driven therefrom, a material carrying strip between said chains and forming the material carrying surface of said conveyor, longitudinally spaced flights pivotally connected to said chains and extending inwardly therefrom beneath and across said strip and having conveying fingers extending perpendicularly thereto and spaced apart a distance slightly greater than the width of said strip, guide means guiding said fingers to extend above the surface of said strip at the receiving end of said conveyor to convey cookies therealong, a guide track spaced in advance of said guide means and recessing certain of said fingers beneath the material carrying surface of said strip, another guide track retaining certain of said fingers above the material carrying surface of said strip, a switch forming a continuation of said guide means and guide tracks and operable to switch said flights to retain said fingers above or below the material carrying surface of said strip, to effect a separation and counting of the cookies conveyed along the surface of said strip, said switch means being positioned to normally recess said conveying fingers below the material carrying surface of said strip, and power means for periodically operating said switch means to effect the projection of certain of said fingers above the material carrying surface of said strip.

15. In a counting conveyor for cookies and the like, a pair of parallel spaced drive sprockets rotatable about a common horizontal axis, a pair of parallel spaced idler sprockets spaced longitudinally of said drive sprockets, a pair of endless chains trained about said sprockets, a material carrying strip extending between said endless chains, guide plates extending along opposite sides of said strip and spaced therefrom, a plurality of longitudinally spaced flights pivoted to said chains at their opposite ends and having legs extending from the points of pivotal connection of said flights to said chains in a direction away from the direction of travel of said chains, arms extending downwardly from said legs in a generally angular direction and a transverse flight structure connecting the lower ends of said arms together and recessed by said arms beneath said strip and having parallel spaced fingers extending perpendicular thereto toward opposite sides of said strip, a roller on at least one of said arms adjacent the point of connection of said flight structure thereto, a track extending generally parallel to said strip and engaged by said roller and retaining said conveying fingers to extend above said strip, a switch track extending angularly downwardly of said first mentioned track and along and beneath said strip in a plane generally parallel to the plane thereof and forming a guide track for said rollers, retaining said fingers beneath the material carrying surface of said strip, a track switch movable into position to guide certain of said rollers along said first mentioned track to effect the projection of certain of said conveying fingers above the material carrying surface of said strip, and operable to switch said rollers to said switch track and recess certain other of said conveying fingers beneath the material carrying surface of said strip, a cam, drive means for rotatably driving said cam, a link and leverage connection between said cam and said track switch normally holding said track switch in position to guide said rollers along said switch track and periodically moving said track switch into position to guide said rollers along said first mentioned track to project said fingers above the material carrying surface of said strip and effect the counting and separating of the material carried thereby into uniform groups.

16. In a counting conveyor for cookies and the like, a pair of parallel spaced drive sprockets rotatable about a common horizontal axis, a pair of parallel spaced idler sprockets spaced longitudinally of said drive sprockets, a pair of endless chains trained about said sprockets, a material carrying strip extending between said endless chains, guide plates extending along opposite sides of said strip and spaced therefrom, a plurality of longitudinally spaced flights pivoted to said chains at their opposite ends and having legs extending from the points of pivotal connection of said flights to said chains in a direction away from the direction of travel of said chains, arms extending downwardly from said legs in a generally angular direction and a transverse flight structure connecting the lower ends of said arms together and recessed by said arms beneath said strip and having parallel spaced fingers extending perpendicular thereto toward opposite sides of said strip, a roller on at least one of said arms adjacent the point of connection of said flight structure thereto, a track extending generally parallel to said strip and engaged by said roller and retaining said conveying fingers to extend above said strip, a switch track extending angularly downwardly of said first mentioned track and along and beneath said strip in a plane generally parallel to the plane thereof and forming a guide track for said rollers, retaining said fingers beneath the material carrying surface of said strip, a track switch, a guide for said rollers extending along the receiving end of said conveyor and supporting said rollers to project said fingers to engage and convey cookies along their edges upwardly to said track switch, said track switch forming a continuation of said guide and being operable to guide a selected number of rollers along said switch track to recess the associated fingers beneath the material carrying surface of said strip and to guide certain other rollers along said first mentioned track and project the spaced fingers associated therewith above said strip and travel therealong in predetermined spaced relation, depending upon the count of cookies required for each row of cookies.

17. In a counting conveyor for cookies and the like, a pair of parallel spaced drive sprockets rotatable about a common horozintal axis, a pair of parallel spaced idler sprockets spaced longitudinally of said drive sprockets, a pair of endless chains trained about said sprockets, a material carrying strip extending between said endless chains, guide plates extending along opposite sides of said strip and spaced therefrom, a plurality of longitudinally spaced flights pivoted to said chains at their opposite ends and having legs extending from the points of pivotal connection of said flights to said chains in a direction away from the direction of travel of said chains, arms extending downwardly from said legs in a generally angular direction, and a transverse flight structure connecting the lower ends of said arms together and recessed by said arms beneath said strip and having parallel spaced fingers extending perpendicular thereto toward opposite sides of said strip, a roller on at least one of said arms adjacent the point of connection of said flight structure thereto, a track extending generally parallel to said strip and engaged by said roller and retaining said conveying fingers to extend above said strip, a switch track extending angularly downwardly of said first mentioned track and along and beneath said strip in a plane generally parallel to the plane thereof and forming a guide track for said rollers, retaining said fingers beneath the material carrying surface of said strip, a track switch, a guide for said rollers extending along the receiving end of said conveyor and supporting said rollers to project said fingers to engage and convey cookies along their edges upwardly to said track switch, said track switch forming a continuation of said guide and being operatble to guide a selected number of rollers along said switch track to recess the associated fingers beneath the material carrying surface of said strip and to guide certain other rollers along said first mentioned track and project the spaced fingers associated therewith above said strip and travel therealong in predetermined spaced relation, depending upon the count of cookies required for each row of cookies, means for periodically operating said track switch comprising a cam, means rotatably driving said cam, a link and leverage connection between said cam and said track switch normally holding said track switch to guide said rollers along said switch track and periodically moving said track switch to guide said rollers along said first mentioned track to effect the projection of selected conveying fingers above the material carrying surface of said strip and the separating of the cookies in groups in accordance with the spacing of said fingers and the time of operation of said track switch.

18. A counting conveyor in accordance with claim 17, wherein the drive to the cam comprises at least two meshing gears and wherein at least one of the gears in interchangeable to vary the speed of rotation of the cam and the resultant spacing of the conveying fingers above the material carrying surface of said strip and the count of cookies conveyed thereby.

19. In an apparatus for loading cookies into trays, cartons and the like, an upwardly inclined counting conveyor, counting and separating individual cookies into groups, a transfer conveyor forming a horizontal continuation of said counting conveyor, a tray conveyor extending beneath said transfer conveyor, transversely thereof, a drop chute supported to afford communication between said transfer conveyor and said tray conveyor, a drop gate forming a material carrying surface of said tray conveyor, means moving said drop gate laterally to effect the dropping of a group of cookies through said drop chute, and means operable in timed relation with respect to operation of said drop gate, to position a tray in cookie receiving relation with respect to said drop chute, and thereby accommodate the loading of the tray, comprising at least one stop on said tray conveyor and biased into the path of travel of a tray traveling along said tray conveyor, and means withdrawing said stop from the path of travel of the tray along said transfer conveyor at the termination of a cookie dropping operation.

20. In an apparatus for loading cookies into trays, cartons and the like, an upwardly inclined counting conveyer, counting and separating individual cookies into groups, a transfer conveyor forming a horizontal continuation of said counting conveyor, a tray conveyor extending beneath said transfer conveyor, transversely thereof, a drop chute supported to afford communication between said transfer conveyor and said tray conveyor, a drop gate forming a material carrying surface of said tray conveyor, means moving said drop gate laterally to effect the dropping of a group of cookies through said drop chute, and means operable in timed relation with respect to operation of said drop gate, to position a tray in cookie receiving relation with respect to said drop chute and to control the advance of the tray, step by step, and thereby accommodate the successive loading of the tray comprising a plurality of stops spaced along said tray conveyor distances apart equal to the travel of a tray necessary to provide the space to load at least one row of cookies therein, means pivotally supporting said stops for free pivotal movement into the path of travel of the tray, and other means driven in timed relation with resepect to operation of said drop gate, for periodically moving said stops out of the path of travel of the tray for a period sufficient to accommodate the advance of a tray past an associated stop and advance a distance equal to the space between two of said stops.

21. In an apparatus for loading cookies into trays, cartons and the like, an upwardly inclined counting conveyor, counting and separating individual cookies into groups, a transfer conveyor forming a horizontal continuation of said counting conveyor, a tray conveyor extending beneath said transfer conveyor, transversely thereof, a drop chute supported to afford communication between said transfer conveyor and said tray conveyor, a drop gate forming a material carrying surface of said tray conveyor, means moving said drop gate laterally to effect the dropping of a group of cookies through said drop chute, a shaft mounted on one side of said tray conveyor and extending therealong and spaced thereabove, a plurality of stops freely mounted on said shaft in advance of said drop chute and spaced therealong and biased by gravity to move into the path of travel of a tray movable along said transfer conveyor, a first stop being positioned adjacent the outgoing side of said drop chute and retaining a tray therebeneath for the first loading operation, the remaining stops being spaced in advance of said first stop distances equal to the space required for each additional loading operation, and means on said shaft and actuated by pivotal movement thereof for retracting said stops for a time interval sufficient to accommodate a carton to pass by one of said stops at the termination of each loading operation, and releasing said stops to position a tray for a next succeeding loading operation.

22. In an apparatus for loading cookies into trays, cartons and the like, an upwardly inclined counting conveyor, counting and separating individual cookies into groups, a transfer conveyor forming a horizontal continuation of said counting conveyor, a tray conveyor extending beneath said transfer conveyor, transversely thereof, a drop chute supported to afford communication between said transfer conveyor and said tray conveyor, a drop gate forming a material carrying surface of said tray conveyor, means moving said drop gate laterally to effect the dropping of a group of cookies through said drop chute, a shaft mounted on one side of said tray conveyor and extending therealong and spaced thereabove, a plurality of stops freely mounted on said shaft in advance of said drop chute and spaced therealong and biased by gravity to move into the path of travel of a tray movable along said transfer conveyor, a first stop being positioned adjacent the outgoing side of said drop chute and retaining a tray therebeneath for the first loading operation, the remaining stops being spaced in advance of said first stop distances equal to the space required for each additional loading operation, an operator secured to said shaft on the outer sides of the end stops of said stops and extending along said stops, means driven in timed relation with lateral movement of said drop gate, for pivoting said shaft and operator to withdraw said stops from the paths of travel of the trays, and accommodate said stops to return by gravity, and allow a next downwardly spaced stop to effect a positioning operation of a tray for a next succeeding loading operation.

23. In an apparatus for loading cookies into trays, cartons and the like, an upwardly inclined counting conveyor, counting and separating individual cookies into groups, a transfer conveyor forming a horizontal continuation of said counting conveyor, a tray conveyor extending beneath said transfer conveyor, transversely thereof, a drop chute supported to afford communication between said transfer conveyor and said tray conveyor, a drop gate forming a material carrying surface of said tray conveyor, means moving said drop gate laterally to effect the dropping of a group of cookies through said drop chute, a shaft mounted on one side of said tray conveyor and extending therealong and spaced thereabove, a plurality of stops freely mounted on said shaft in advance of said drop chute and spaced therealong and biased by gravity to move into the path of travel of a tray movable along said transfer conveyor, a first stop being positioned adjacent the outgoing side of said drop chute and retaining a tray therebeneath for the first loading operation, the remaining stops being spaced in advance of said first stop distances equal to the space required for each additional loading operation, an operator secured to said shaft on the outer sides of the end stops of said stops and extending along said stops, means driven in timed relation with lateral movement of said drop gate, for pivoting said shaft and operator to withdraw said stops from the paths of travel of the trays, and accommodate said stops to return by gravity, and allow a next downwardly spaced stop to effect a positioning operation of a tray for a next succeeding loading operation, a cam shaft, a cam on said cam shaft, a linkage and leverage connection from said cam to said drop gate for laterally moving said drop gate, another cam on said cam shaft, and a linkage and leverage connection from said last mentioned cam to said operator for pivoting said operator to withdraw said stops at the termination of a cookie dropping operation, and to accommodate said stops to return by gravity to effect a next succeeding positioning operation.

24. In an apparatus for loading cookies and the like, a counting conveyor, conveying, counting and separating cookies into spaced aligned groups, said counting conveyor having at least one material carrying strip extending therealong and flights movable beneath said strip and having material conveying fingers extending upwardly along opposite sides of said strip, for moving cookies along said strip, means operable in accordance with a selected count of cookies for each separated group of cookies, for retracting certain of said conveying fingers to effect a counting and separation of cookies into groups, a tray conveyor extending transversely of said counting conveyor, a transfer conveyor forming a horizontal continuation of said counting conveyor and extending over said tray conveyor, at least one drop chute in cookie receiving relation with respect to said transfer conveyor, a drop gate forming a continuation of said material carrying strip and forming the material carrying surface of said transfer conveyor and extending over said drop chute, parallel guide plates extending along opposite sides of said drop gate, means for driving said counting conveyor and said transfer conveyor, and including an endless chain and sprocket having driving connection with said transfer conveyor, a reciprocably movable carriage having sprockets thereon, means wrapping the drive and slack runs of said endless chain about said sprockets, means moving said carriage and spaced sprockets back and forth in timed relation with respect to travel of said counting conveyor to place a dwell in the travel of said transfer conveyor as a row of cookies on said drop gate is in registery with said drop chute, other means moving said drop gate laterally to release at least one row of cookies to drop through said drop chute, means driving said tray conveyor to convey trays into cookie receiving relation with respect to said drop chute, means operable to successively position trays on said tray conveyor for successive loading thereof through said drop chute upon lateral movement of said drop gate, comprising a shaft mounted to one side of said tray conveyor and spaced thereabove and extending therealong and having a plurality of stop fingers freely mounted thereon on the outgoing side of said drop chute and spaced along said shaft distances equal to the space required in said tray for each successive loading operation, means momentarily retracting said stop fingers at the termination of a loading operation, a common cam shaft, a drive connection from said cam shaft to said transfer conveyor, individual cams on said shaft for operating said means for retracting certain of said conveying fingers to effect a counting operation, for effecting a dwell in the travel of said transfer conveyor for moving said drop gate laterally to effect a dumping operation during a dwell in the travel of said transfer conveyor, and for retracting said positioning fingers at the termination of a loading operation to effect a series of successive counting and loading operations in a selected sequence.

25. In an apparatus for loading cookies and the like, a counting conveyor, conveying, counting and separating cookies into spaced aligned groups, said counting conveyor having at least one material carrying strip extending therealong and flights movable beneath said strip and having material conveying fingers extending upwardly along opposite sides of said strip, for moving cookies along said strip, means operable in accordance with a selected count of cookies for each separated group of cookies, for retracting certain of said conveying fingers to effect a counting and separation of cookies into groups, a tray conveyor extending transversely of said counting conveyor, a transfer conveyor forming a horizontal continuation of said counting conveyor and extending over said tray conveyor, at least one drop chute in cookie receiving relation with respect to said transfer conveyor, a drop gate forming a continuation of said material carrying strip and forming the material carrying surface of said transfer conveyor and extending over said drop chute, parallel guide plates extending along opposite sides of said drop gate, means for driving said counting conveyor and said transfer conveyor, and including an endless chain and sprocket having driving connection with said transfer conveyor, a reciprocably movable carriage having sprockets thereon, means wrapping the drive and slack runs of said endless chain about said sprockets, means moving said carriage and spaced sprockets back and forth in timed relation with respect to travel of said counting conveyor to place a dwell in the travel of said transfer conveyor as a row of cookies on said drop gate is in registry with said drop chute, other means moving said drop gate laterally to release at least one row of cookies to drop through said drop chute, means driving said tray conveyor to convey trays into cookie receiving relation with respect to said drop chute, means operable to successively position trays on said tray conveyor for successive loading thereof through said drop chute upon lateral movement of said drop gate, comprising a shaft mounted to one side of said tray conveyor and spaced thereabove and extending therealong and having a plurality of stop fingers freely mounted thereon on the outgoing side of said drop chute and spaced along said shaft distances equal to the space required in said tray for each successive loading operation, means momentarily retracting said stop fingers at the termination of a loading operation, a common cam shaft, a drive connection from said cam shaft to said transfer conveyor, individual cams on said shaft for operating said means for retracting certain of said conveying fingers to effect a counting operation, for effecting a dwell in the travel of said transfer conveyor for moving said drop gate laterally to effect a dumping operation during a dwell in the travel of said transfer conveyor, and for retracting said positioning fingers at the termination of a loading operation, to effect a series of successive counting and loading operations in a selected sequence, means driving said cam shaft comprising a pair of meshing spur gears, said spur gears being interchangeable to vary the count of cookies separated and the time of dwell of said transfer conveyor, the time of lateral movement of said drop gate, and the time of retraction of said positioning stops, to effect successive loading operations for groups of cookies of various selected counts.

26. In an apparatus for loading cookies and the like, a counting conveyor, conveying, counting and separating cookies into spaced aligned groups, said counting conveyor having at least one material carrying strip extending therealong and flights movable beneath said strip and having material conveying fingers extending upwardly along opposite sides of said strip, for moving cookies along said strip, means operable in accordance with a selected count of cookies for each separated group of cookies, for retracting certain of said conveying fingers to effect a counting and separation of cookies into groups, a tray conveyor extending transversely of said counting conveyor, a transfer conveyor forming a horizontal continuation of said counting conveyor and extending over said tray conveyor, at least one drop chute in cookie receiving relation with respect to said transfer conveyor, a drop gate forming a continuation of said material carrying strip and forming the material carrying surface of said transfer conveyor and extending over said drop chute, parallel guide plates extending along opposite sides of said drop gate, means for driving said counting conveyor and said transfer conveyor, and including an endless chain and sprocket having driving connection with said transfer conveyor, a reciprocably movable carriage having sprockets thereon, means wrapping the drive and slack runs of said endless chain about said sprockets, means moving said carriage and spaced sprockets back and forth in timed relation with respect to travel of said counting conveyor to place a dwell in the travel of said transfer conveyor as a row of cookies on said drop gate is in registry with said drop chute, other means moving said drop gate laterally to release at least one row of cookies to drop through said drop chute, means driving said tray conveyor to convey trays into cookie receiving relation with respect to said drop chute, means operable to successively position trays on said tray conveyor for successive loading thereof through said drop chute upon lateral movement of said drop gate, comprising a shaft mounted to one side of said tray conveyor and spaced thereabove and extending therealong and having a plurality of stop fingers freely mounted thereon on the outgoing side of said drop chute and spaced along said shaft distances equal to the space required in said tray for each successive loading operation, a delay finger spaced from the incoming side of said conveyor and mounted for pivotal movement about an axis extending transversely of the conveyor to engage the ends of certain trays and place a gap between said tray and the next advance tray, means driven by the means for releasing said stops for operating said tray delay finger, a cam shaft, means driving said cam shaft comprising a pair of meshing spur gears, and individual cams on said cam shaft for operating said means for effecting the retraction of certain conveying fingers to effect a counting operation, for effecting a dwell in the travel of said transfer conveyor, for moving said drop gate laterally during a dwell in travel of said transfer conveyor, for retracting said stop fingers and for operating said delay finger to place a gap between certain of said trays.

27. In an apparatus for loading cookies into trays and the like, an upwardly inclined counting conveyor counting and separating cookies into groups, a transfer conveyor forming a horizontal continuation of said counting conveyor, a tray conveyor extending beneath said transfer conveyor and transversely thereof, a drop chute forming a communicating means between said transfer and said tray conveyor, a drop gate extending over said drop chute and forming a material carrying surface of said transfer conveyor and movable laterally to accommodate a row of cookies to drop through said drop chute into a tray on said transfer conveyor, and means operable to place a gap in certain trays traveling along said tray conveyor to position a next rearward tray of a series of aligned trays to move into position between said drop chute into a loading position, comprising a delay finger spaced from the incoming side of said drop chute and mounted for pivotal movement about an axis extending transversely of said tray conveyor, to move into and out of the path of travel of aligned trays traveling along said tray conveyor, and means driven in timed relation with respect to operation of said drop gate for raising and lowering said delay finger into and out of path of travel of the tray movable along said tray conveyor.

28. In an apparatus for loading cookies into trays and the like, an upwardly inclined counting conveyor counting and separating cookies into groups, a transfer conveyor forming a horizontal continuation of said counting conveyor, a tray conveyor extending beneath said transfer conveyor and transversely thereof, a drop chute forming a communicating means between said transfer and said tray conveyor, a drop gate extending over said drop chute and forming a material carrying surface of said transfer conveyor and movable laterally to accommodate a row of cookies to drop through said drop chute into a tray on said transfer conveyor, and means operable to place a gap in certain trays traveling along said tray conveyor to position a next rearward tray of a series of aligned trays to move into position between said drop chute into a loading position, comprising a delay finger spaced from the incoming side of said drop chute and mounted for pivotal movement about an axis extending transversely of said tray conveyor, means mounting said delay finger in vertically spaced relation with respect to said conveyor and accommodating adjustable movement of said finger along said conveyor, and drive means for said finger for rocking said finger into and out of position to engage the end of a tray movable along said conveyor comprising a drive member extending along one side of said conveyor and mounted for rocking movement with respect thereto and having a slot extending therealong, means for rocking said drive member, and a crank having operative connection with said delay finger and having slidable connection with said slot for rocking said delay finger upon rocking movement of said drive member in all positions of adjustment of said delay finger.

29. In an apparatus for loading cookies and the like, a counting conveyor, conveying, counting and separating cookies into spaced aligned groups, a tray conveyor extending transversely of said counting conveyor, a loading station comprising a transfer conveyor forming a continuation of said counting conveyor and extending over said tray conveyor, at least one drop chute in cookie receiving relation with respect to said transfer conveyor and in cookie discharge relation with respect to said tray conveyor, a drop gate forming the material carrying surface of said transfer conveyor and extending over said drop chute, means for moving said drop gate laterally with respect to said transfer conveyor upon registry of a row of cookies over said chute to drop the cookies through said drop chute for loading during a dwell in the operation of said transfer conveyor, means positioning trays on said transfer conveyor in cookie receiving relation with respect to said drop chute, said drop chute including a hopper-like chute registrable with a tray on said tray conveyor, and having a rear wall having a movable guide forming a downward continuation thereof, and means for moving said movable guide into an associated tray to retain cookies dropping into said tray in rows, and retracting said guide from said tray upon the completion of a loading operation.

30. In an apparatus for loading cookies and the like, a counting conveyor, conveying, counting and separating cookies into spaced aligned groups, a tray conveyor extending transversely of said counting conveyor, a loading station comprising a transfer conveyor forming a continuation of said counting conveyor and extending over said tray conveyor, at least one drop chute in cookie receiving relation with respect to said transfer conveyor and in cookie discharge relation with respect to said tray conveyor, a drop gate forming the material carrying surface of said transfer conveyor and extending over said drop chute, means for moving said drop gate laterally with respect to said transfer conveyor upon registry of a row of cookies over said chute to drop the cookies through said drop chute for loading during a dwell in the operation of said transfer conveyor, means positioning trays on said transfer conveyor in cookie receiving relation with respect to said drop chute, said drop chute including a hopper-like chute registrable with a tray on said tray conveyor and having a rear wall having a movable guide forming a downward continuation thereof, and means driven by the means for moving said drop gate laterally, for moving said guide downwardly during each cookie dropping operation, and accommodating upward movement of said guide at the termination of a cooking dropping operation.

31. In an apparatus for loading cookies and the like, a counting conveyor, conveying, counting and separating cookies into spaced aligned groups, a tray conveyor extending transversely of said counting conveyor, a transfer conveyor forming a continuation of said counting conveyor and extending over said tray conveyor, at least one drop chute in cookie receiving relation with respect to said transfer conveyor and in cookie discharge relation with respect to said tray conveyor, a drop gate forming the material carrying surface of said transfer conveyor and extending over said drop chute, means positioning trays on said transfer conveyor in cookie receiving relation with respect to said drop chute, said drop chute including a hopper-like chute registrable with a tray on said tray conveyor and having a rear wall having a movable guide forming a downward continuation thereof, and means for moving said movable guide into an associated tray to retain cookies dropping into said tray in rows and retracting said guide from said tray upon the completion of a loading operation.

32. In an apparatus of the class described, a tray conveyor, a drop chute extending over said tray conveyor for guiding cookies to drop into trays on said conveyor, a support spaced above said tray conveyor and extending therealong in parallel relation with respect thereto to one side of said drop chute, a shaft journalled in said support and extending therealong in vertically spaced relation with respect to said conveyor, a plurality of stops freely mounted on said shaft on the outgoing side of said drop chute and biased by gravity to move into the path of travel of trays movable along said transfer conveyor, a first stop being positioned adjacent said drop chute and retaining a tray therebeneath for a first loading operation, the remaining stops being spaced in advance of said first stop, distances equal to the space required in said tray for each cookie loading operation, a member mounted on said shaft and extending along said stops and operable to momentarily retract said stops at the termination of one cookie loading operation, means mounting said support for movement toward and from the center of said conveyor to adjust the positions of said stops in accordance with the width of tray being loaded, and drive means for said shaft rockably driving said shaft in all positions of adjustment of said support comprising a rockable drive member extending across the rear end of said conveyor, means for rocking said drive member in timed relation with respect to the dropping of cookies through said chute, and a crank on said shaft having slidable engagement with said drive member and rocked thereby.

33. In an apparatus of the class described, a tray conveyor, a drop chute extending over said tray conveyor for guiding cookies to drop into trays on said conveyor, a support spaced above said tray conveyor and extending therealong in parallel relation with respect thereto to one side of said drop chute, a shaft journalled in said support and extending therealong in vertically spaced relation with respect to said conveyor, a plurality of stops freely mounted on said shaft on the outgoing side of said drop chute and biased by gravity to move into the path of travel of trays movable along said transfer conveyor, a first stop being positioned adjacent said drop chute and retaining a tray therebeneath for a first loading operation, the remaining stops being spaced in advance of said first stop, distances equal to the space required in said tray for each cookie loading operation, a member mounted on said shaft and extending along said stops and operable to momentarily retract said stops at the termination of one cookie loading operation, means mounting said support for movement toward and from the center of said conveyor to adjust the positions of said stops in accordance with the width of tray being loaded, a bracket mounted on said support on the incoming side of said drop chute and extending from said support over said conveyor into alignment with said drop chute, means accommodating adjustment of said bracket along said support, a delay finger transversely pivoted to said bracket at the incoming side of said drop gate and operated to engage the ends of certain trays and place a gap therebetween and retain the tray in position to be advanced by said conveyor for loading at its advance end, a drive member pivotally mounted beneath said support and extending therealong, a crank for rocking said delay finger and having slidable engagement with said drive member to periodically raise and lower said delay finger in all positions of said bracket along said support, and means for rocking said shaft and said rockable drive member to withdraw said stop fingers upon the completion of a cookie operation and operate said delay finger to place a gap between certain trays comprising a rockable drive member extending across the rear end of said conveyor and mounted for movement about an axis extending transversely of said conveyor, means for rocking said drive member in timed relation with respect to the dropping of cookies through said chute, and a crank on said shaft having slidable engagement with said drive member for rocking said shaft to retract said fingers in all positions of said bracket with respect to said drive member.

34. In an apparatus for counting and loading cookies and the like, an inclined counting conveyor, a transfer conveyor forming a horizontal continuation of said counting conveyor and including a cookie carrying strip forming a continuation of the carrying surface of said counting conveyor, a drive sprocket and an idler sprocket rotatable about spaced horizontal axes, an endless chain trained about said sprockets, one of said sprockets being disposed above and adjacent the discharge end of said counting conveyor, means for intermittently driving said drive sprocket and the endless chain trained thereabout and placing a dwell in travel of said chain, to accommodate a dumping operation, parallel spaced flights mounted on said chain and extending outwardly therefrom, said flights being spaced in accordance with the length of rows of cookies separated and counted by said counting conveyor, an advance flight of said flights leading a row of a predetermined number of cookies and a rear flight of said spaced flights coming behind a row of cookies and pushing the cookies along said strip, means rigidly mounting the rear flight to said chain and a transverse pivotal mounting for the advance flight to said chain accommodating retractible movement of said flight as it turns about its sprocket adjacent the discharge end of the counting conveyor, and means controlling movement of said flight to retract said flight as it turns about its sprocket above the discharge end of said counting conveyor to accommodate said sprocket to clear cookies transferred from said counting conveyor to said transfer conveyor during acceleration of said transfer conveyor prior to a dwell in travel thereof and to come in front of a row of cookies on said counting conveyor at the angle thereof to maintain the row of cookies upright during transfer by said transfer conveyor.

35. In an apparatus for conveying cookies and the like, an inclined counting conveyor, a horizontal transfer conveyor extending from said counting conveyor and including a generally horizontal cookie carrying strip forming a continuation of said counting conveyor, horizontally spaced drive and idler sprockets, an endless chain trained about said sprockets, one of said sprockets being disposed above and adjacent the discharge end of said counting conveyor, an intermittent drive for said drive sprocket and endless chain placing a dwell in travel of said endless chain to accommodate a dumping operation, parallel spaced flights extending across said chain and mounted thereon, said flights having conveying fingers extending perpendicular thereto, one flight and conveying finger pushing a separated row of cookies along said conveying strip, the next advance flight and conveying finger leading a row of cookies pushed along said strip and retaining the cookies for travel in rows along their edges, the last mentioned retaining flights being transversely pivoted to said endless chain, and a separate link controlling pivotal movement of said retaining flights and moving said retaining flights during travel about said sprocket at the discharge end of said counting conveyor to shorten the distance between the associated conveying fingers and endless chain as it turns about said sprocket and avoid the interference between said conveying fingers and cookies traveling upwardly along said counting conveyor caused by a change in speed of said transfer conveyor to effect a dwell in travel thereof comprising a link pivotally connected to each advance flight of said flights and extending forwardly therefrom, and a pivotal connection between the forward end of each link and said endless chain.

36. In an intermittent drive of the class described, a sprocket, an endless chain driving said sprocket and having a driving run and a slack run, a reciprocably movable carriage having spaced sprockets thereon, means wrapping said driving run partially about one of said sprockets and said slack run partially about the other of said sprockets, means moving said carriage back and forth to accelerate and decelerate said endless chain and place a dwell in travel of a said sprocket comprising a rocking arm, means for rocking said rocking arm, a link connecting said rocking arm to said carriage, the points of connection of said link to said rocking arm and said carriage being interchangeable to vary the effective length of said rocking arm and the length of the dwell in rotation of said sprocket.

References Cited by the Examiner

UNITED STATES PATENTS

| | | | |
|---|---|---|---|
| 1,279,562 | 9/1918 | Lowell | 198—30 X |
| 2,656,656 | 10/1953 | Murdoch et al. | 53—147 X |
| 2,755,907 | 7/1956 | McCullough et al. | 198—35 |
| 2,936,557 | 5/1960 | Fay | 53—159 |
| 3,084,783 | 5/1963 | Morton et al. | 198—35 |

TRAVIS S. McGEHEE, *Primary Examiner.*